United States Patent
Iki

(10) Patent No.: US 10,389,198 B2
(45) Date of Patent: Aug. 20, 2019

(54) STATOR FOR ELECTRIC ROTARY MACHINE

(71) Applicant: HONDA MOTOR CO., LTD., Tokyo (JP)

(72) Inventor: Tomotaka Iki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 380 days.

(21) Appl. No.: 15/300,369

(22) PCT Filed: Mar. 31, 2014

(86) PCT No.: PCT/JP2014/059556
§ 371 (c)(1),
(2) Date: Sep. 29, 2016

(87) PCT Pub. No.: WO2015/151200
PCT Pub. Date: Oct. 8, 2015

(65) Prior Publication Data
US 2017/0141635 A1  May 18, 2017

(51) Int. Cl.
*H02K 3/28* (2006.01)
*H02K 3/04* (2006.01)
(Continued)

(52) U.S. Cl.
CPC .............. *H02K 3/28* (2013.01); *H02K 3/12* (2013.01); *H02K 3/32* (2013.01)

(58) Field of Classification Search
CPC .. H02K 3/28; H02K 3/04; H02K 3/12; H02K 3/48; H02K 3/50; H02K 3/32; H02K 15/06; H02K 15/062
See application file for complete search history.

(56) References Cited

U.S. PATENT DOCUMENTS

| 1,826,296 | A | | 10/1931 | Apple |
| 6,124,660 | A | * | 9/2000 | Umeda ............... H02K 1/243 |
| | | | | 310/201 |

(Continued)

FOREIGN PATENT DOCUMENTS

| CN | 102891547 A | | 1/2013 | |
| EP | 3128648 A1 | * | 2/2017 | ............... H02K 3/28 |

(Continued)

OTHER PUBLICATIONS

Japanese Decision to Decline the Amendment dated Jan. 9, 2018, issued in counterpart Japanese Application No. 2016-511220, with English machine translation. (6 pages).

(Continued)

*Primary Examiner* — Edgardo San Martin
(74) *Attorney, Agent, or Firm* — Westerman, Hattori, Daniels & Adrian, LLP

(57) ABSTRACT

A stator for an electric rotary machine including a stator core and a coil, wherein the coil has plural slot coils, each slot coil being inserted into the slot, and plural connection coils, each connection coil connecting the slot coils in a position lying further axially outwards than an axial end face of the stator core, and is constituted in such a way that the slot coil and the connection coil are joined at an abutment portion; the slot coil and the connection coil are formed by plate conductors, the plate conductor having a plate surface that is planar and that intersects a thickness direction thereof; and the plate surface of the slot coil is brought into surface contact with the plate surface of the connection coil in the abutment portion.

10 Claims, 18 Drawing Sheets

(51) Int. Cl.
*H02K 3/12* (2006.01)
*H02K 3/32* (2006.01)
*H02K 3/00* (2006.01)

(56) References Cited

U.S. PATENT DOCUMENTS

| | | | | |
|---|---|---|---|---|
| 6,548,933 | B2* | 4/2003 | Yasuhara | H02K 3/12 |
| | | | | 310/203 |
| 9,118,224 | B2* | 8/2015 | Okimitsu | H02K 3/12 |
| 9,343,944 | B2* | 5/2016 | Kishi | H02K 3/12 |
| 9,362,793 | B2* | 6/2016 | Iki | H02K 3/12 |
| 9,362,809 | B2* | 6/2016 | Kishi | H02K 3/12 |
| 9,577,498 | B2* | 2/2017 | Isoda | H02K 3/325 |
| 9,729,030 | B2* | 8/2017 | Isoda | H02K 3/325 |
| 9,793,773 | B2* | 10/2017 | Iki | H02K 3/28 |
| 2002/0117928 | A1 | 8/2002 | Yasuhara et al. | |
| 2003/0214190 | A1* | 11/2003 | Congdon | H02K 3/28 |
| | | | | 310/71 |
| 2005/0012423 | A1 | 1/2005 | Yasuhara et al. | |
| 2009/0096313 | A1* | 4/2009 | Harada | H02K 3/522 |
| | | | | 310/201 |
| 2009/0261682 | A1* | 10/2009 | Fubuki | H02K 3/12 |
| | | | | 310/201 |
| 2013/0020890 | A1 | 1/2013 | Iki et al. | |
| 2013/0020901 | A1 | 1/2013 | Kishi et al. | |
| 2014/0183993 | A1* | 7/2014 | Takasaki | H02K 3/50 |
| | | | | 310/71 |
| 2015/0280503 | A1* | 10/2015 | Takahashi | H02K 3/12 |
| | | | | 310/201 |
| 2017/0025907 | A1* | 1/2017 | Iki | H02K 3/12 |
| 2017/0025913 | A1* | 1/2017 | Nagahiro | H02K 3/12 |
| 2017/0237310 | A1* | 8/2017 | Nakamura | H02K 3/50 |
| | | | | 310/195 |
| 2017/0256996 | A1* | 9/2017 | Nakamura | H02K 1/16 |
| 2017/0346369 | A1* | 11/2017 | Tanaka | H02K 3/12 |
| 2018/0034339 | A1* | 2/2018 | Hashimoto | H02K 3/18 |
| 2018/0166931 | A1* | 6/2018 | Takahashi | H02K 1/16 |

FOREIGN PATENT DOCUMENTS

| | | | |
|---|---|---|---|
| JP | 57-180445 U | 11/1982 | |
| JP | 2000-270506 A | 9/2000 | |
| JP | 2002-262497 A | 9/2002 | |
| JP | 2007-336651 A | 12/2007 | |
| JP | 2012-16282 A | 1/2012 | |
| JP | 2013-27175 A | 2/2013 | |
| JP | 5389109 B2 | 1/2014 | |
| JP | 6397852 B2 * | 9/2018 | H02K 3/12 |
| WO | WO-2015151200 A1 * | 10/2015 | H02K 3/28 |
| WO | WO-2015151931 A1 * | 10/2015 | H02K 3/12 |

OTHER PUBLICATIONS

Office Action dated Jan. 9, 2018, issued in counterpart Japanese Application No. 2016-511220, with English machine translation. (2 pages).
Office Action dated Aug. 21, 2018, issued in counterpart Chinese Application No. 201480077341.7, with English translation. (12 pages).
Office Action dated Mar. 14, 2018, issued in counterpart Chinese Application No. 201480077341.7. (7 pages).
International Search Report dated Jul. 1, 2014 issued in corresponding application No. PCT/JP2014/059556 (3 pages).

* cited by examiner

STATOR FOR ELECTRIC ROTARY MACHINE

TECHNICAL FIELD

The present invention relates to a stator for an electric rotary machine that can be mounted on an electric vehicle, a hybrid vehicle and the like.

BACKGROUND ART

There have conventionally be known stators of electric rotary machines in which coils are prepared by winding wires around teeth of a stator core. In the conventional electric rotary machines in which the coils are prepared by winding the winding wires around the teeth, since the winding wires and the stator core need to be handled separately and the winding wires are wound around the teeth with insulation paper held therebetween, the winding operation becomes complex, and since the insulation paper is bitten into, there are fears that an appropriate insulation performance cannot be ensured.

Then, in recent years, electric rotary machines have been proposed which employ segment coils as a different type of electric rotary machine stator. For example, in a stator for an electric rotary machine described in Patent Literatures 1 and 2, each connection coil that connects slot coils of the same phase is joined to end portions of slot coils that are inserted into slots in the stator core by crimping.

PRIOR ART LITERATURE

Patent Literature

Patent Literature 1: JP-B-5389109
Patent Literature 2: JP-A-2000-270506

SUMMARY OF THE INVENTION

Problem that the Invention is to Solve

However, in the event that the slot coils and the connection coils are joined together through crimping, it becomes difficult to satisfy the required positional accuracy of the projecting portions and the hole portions at plural crimping portions, and there are also fears that the required joining strength cannot be obtained sufficiently or that the joining strength varies.

In addition, when attempting to enhance the positional accuracy of the projecting portions and the hole portions at the plural crimping portions to the required level, there are fears that the increase in working cost causes the increase of the production cost of the electric rotary machine.

The invention has been made in view of the problems described above, and an object thereof is to provide a stator for an electric rotary machine that is easy to be fabricated and that can obtain a sufficient joining strength with which coils are joined together.

Means for Solving the Problem

With a view to achieving the object, the first aspect provides a stator (e.g., a stator 10 in embodiment) for an electric rotary machine including:

a stator core (e.g., stator core 21 in embodiment), which has plural slots (e.g., slots 23 in embodiment); and a coil (e.g., a coil 50 in embodiment), which is attached to the stator core, wherein:

the coil has plural slot coils (e.g., slot coils 25 in embodiment), each slot coil being inserted into the slot, and plural connection coils (e.g., connection coils 40 in embodiment), each connection coil connecting the slot coils in a position lying further axially outwards than an axial end face (e.g., an end face 21a, 21b in embodiment) of the stator core, and is constituted in such a way that the slot coil and the connection coil are joined at an abutment portion (e.g., an abutment surface P2, P3 in embodiment);

the slot coil and the connection coil are formed by plate conductors, the plate conductor having a plate surface (e.g., a side surface 26, 111a, 27b, 122a) that is planar and that intersects a thickness direction thereof; and the plate surface of the slot coil is brought into surface contact with the plate surface of the connection coil in the abutment portion.

The second aspect provides, based on the first aspect, the stator for an electric rotary machine, wherein:

a step portion (e.g., a step portion 26a, 27a in embodiment) is formed on at least one of the slot coil and the connection coil in such a way that a thickness thereof is reduced partially; and an other of the slot coil and the connection coil is brought into abutment with the step portion formed on the at least one of the slot coil and the connection coil.

The third aspect provides, based on the first or second aspect, the stator for an electric rotary machine, wherein:

the connection coils are aligned so that the plate surfaces thereof follow an axial direction; and a thickness of the connection coil is smaller than an axial width (e.g., an axial width L2 in embodiment) thereof.

The fourth aspect provides, based on any one of the first through third aspects, the stator for an electric rotary machine, wherein:

the connection coil includes an inner connection coil (e.g., an inner connection coil 42 in embodiment) and an outer connection coil (e.g., an outer connection coil 41 in embodiment) that are disposed in different axial positions;

at least one of the inner connection coil and the outer connection coil includes an axial extending portion (e.g., an outer connection coil extending portion 113, an inner connection coil extending portion 124 in embodiment) that extends in the axial direction; and the inner connection coil and the outer connection coil are joined together via the axial extending portion.

The fifth aspect provides, based on any one of the first through fourth aspects, the stator for an electric rotary machine, wherein a thickness (e.g., a thickness t1 in embodiment) of the slot coil and a thickness of the connection coil are equal to each other.

The sixth aspect provides, based on any one of the first through fifth aspects, the stator for an electric rotary machine, wherein a sectional area of the connection coil that intersects an electric current direction at a right angle is greater than a sectional area of the slot coil that intersects the electric current direction at a right angle.

The seventh aspect provides, based on the sixth aspect, the stator for an electric rotary machine, wherein an electric conductivity of a material that makes up the connection coil is smaller than an electric conductivity of a material that makes up the slot coil.

The eighth aspect provides, based on any one of the first through seventh aspects, the stator for an electric rotary machine, wherein:

the slot coils are covered with an insulation material (e.g., an insulation material 28 in embodiment); and the connection coils are accommodated in an insulation plate (e.g., a base plate 31L, 31R in embodiment).

The ninth aspect provides, based on the eighth aspect, the stator for an electric rotary machine, wherein surfaces of the slot coil and the connection coil have no insulation coatings.

The tenth aspect provides a stator (e.g., a stator 10 in embodiment) for an electric rotary machine including:

a stator core (e.g., a stator core 21 in embodiment), which has plural slots (e.g., slots 23 in embodiment); and a coil (e.g., a coil 50 in embodiment), which is attached to the stator core, wherein:

the coil has plural slot coils (e.g., slot coils 25 in embodiment), each slot coil being inserted into the slot, and plural connection coils (e.g., connection coils 40 in the embodiment), each connection coil connecting the slot coils in a position lying further axially outwards than an axial end face (e.g., an end face 21a, 21b in embodiment) of the stator core, and is constituted in such a way that the slot coil and the connection coil are joined at an abutment portion (e.g., an abutment surface P2, P3 in embodiment); and a sectional area of the connection coil that intersects an electric current direction at a right angle is greater than a sectional area of the slot coil that intersects the electric current direction at a right angle.

ADVANTAGE OF THE INVENTION

According to the first aspect, since the slot coils and the connection coils are formed by the plate conductors, the slot coils and the connection coils can easily be fabricated by the conductive materials, whereby the increase in production costs can be suppressed. Since the slot coils and the connection coils are joined together at the abutment portions where the plate surfaces of the plate conductors of the slot coils and the connection coils are brought into surface abutment with each other, it becomes easy to ensure the joining area, whereby not only can the joining strength be ensured but also the increase in contact resistance can be suppressed.

According to the second aspect, the slot coil and the connection coil can easily be positioned at the step portion, and hence, space where to dispose a fastening jig or the like on the periphery thereof can be omitted.

According to the third aspect, the thickness of the connection coil that is arranged so that the plate surface follows the axial direction is smaller than the axial width thereof, and therefore, the connection coils of different phases that are arranged in the same axial position can be disposed closely in a circumferential direction. By adopting this configuration, the increase in axial width (the increase in the number of stages) can be suppressed which would otherwise be caused by stacking up the connection coils of different phases in the axial direction, whereby the stator can be made smaller in size as a whole.

According to the fourth aspect, since the necessity of a connecting member is obviated which connects the inner connection coil and the outer connection coil that are disposed in the different axial positions, the increase in the number of parts making up the coil can be suppressed.

According to the fifth aspect, since the slot coil and the connection coil can be formed of the common sheet material, the yield of the material can be improved, thereby making it possible to suppress the increase in production costs.

According to the sixth aspect, in the slot coil disposed in the slot, the sectional area of the conductor tends to be limited by the limitation on the slot dimensions. However, the sectional area of the conductor of the connection coil that is positioned further axially outwards than the axial end face of the stator core and which is hence free from the limitation described above is made greater than the sectional area of the conductor of the slot coil, whereby the increase in electrical resistance of the whole of the coil can be suppressed, thereby making it possible to suppress the copper loss.

According to the seventh aspect, an inexpensive material having a small electric conductivity can be used, and the increase in electrical resistance can be suppressed by making the sectional area of the conductor of the connection coil greater than the sectional area of the conductor of the slot coil.

According to the eighth aspect, the insulation between the adjacent connection coils or the adjacent slot coils can be ensured by the insulation material and the insulation plate.

According to the ninth aspect, since the insulation between the slot coils or the connection coils can be ensured by the insulation material and the insulation plate without covering the surfaces of the slot coil and the connection coil with the insulation coatings, the increase in production costs can be suppressed, compared with a case where a conductor is used which is covered with an insulating coating in advance.

According to the tenth aspect, in the slot coil disposed in the slot, the sectional area of the conductor tends to be limited by the limitation on the slot dimensions. However, the sectional area of the conductor of the connection coil that is positioned further axially outwards than the axial end face of the stator core and which is hence free from the limitation described above is made greater than the sectional area of the conductor of the slot coil, whereby the increase in electrical resistance of the whole of the coil can be suppressed, thereby making it possible to suppress the copper loss.

MODE FOR CARRYING OUT THE INVENTION

Figure 1:
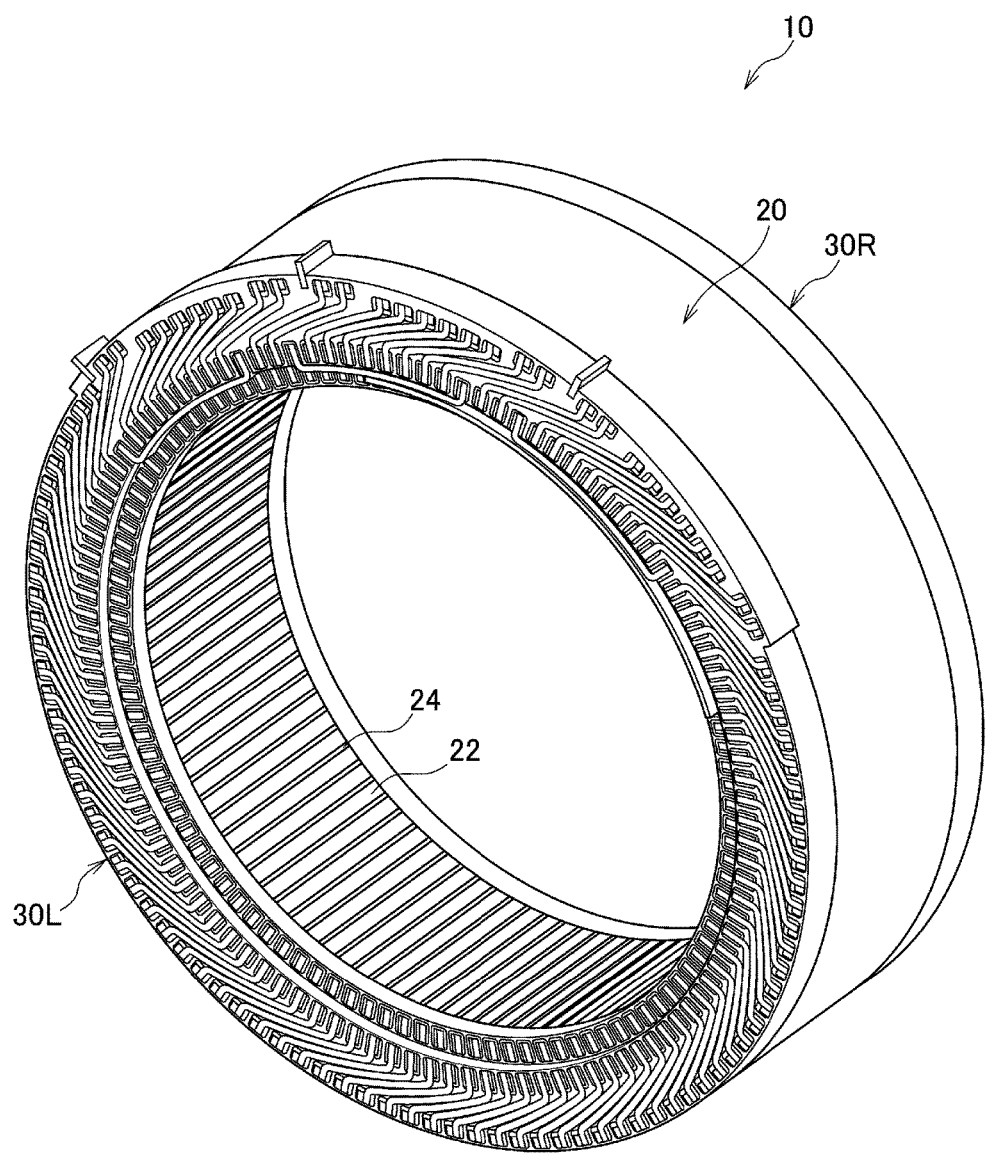
FIG. 1 is a perspective view of a stator for an electric rotary machine according to the invention.

Hereinafter, an embodiment of a stator for an electric rotary machine of the invention will be described based on the accompanying drawings. The drawings should be seen in a direction in which reference numerals given therein look proper.

[Stator]

Figure 2:
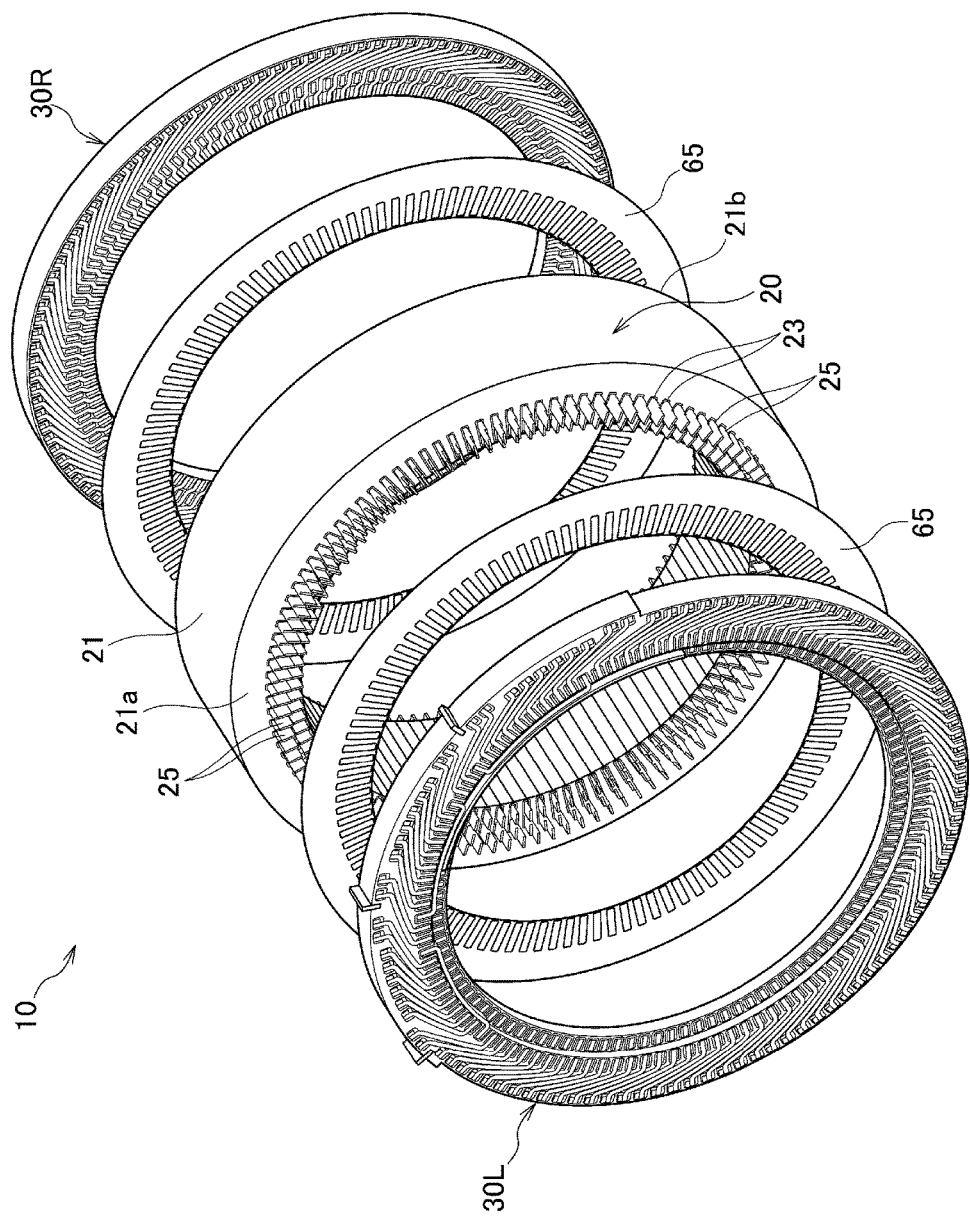
FIG. 2 is an exploded perspective view of the stator shown in FIG. 1.

As shown in FIGS. 1 and 2, a stator 10 for an electric rotary machine of this embodiment includes a stator core assembly 20 and a pair of base plate assemblies 30L, 30R, and the base plate assemblies 30L, 30R are disposed at both ends of the stator core assembly 20. An insulation sheet 65 of, for example, a silicone sheet is disposed between the stator core assembly 20 and each of the base plate assemblies 30L, 30R to insulate the stator core assembly 20 from the base plate assemblies 30L, 30R.

[1 Stator Core Assembly]

The stator core assembly 20 includes a stator core 21 and plural (108 in the illustrated embodiment) slot coils 25.

[1-1 Stator Core]

The stator core 21 is made up, for example, of plural pressed and punched sheets of silicon steel that are laminated together and includes plural (108 in the illustrated embodiment) teeth 22 and plural (108 in the illustrated embodiment) slots 23 that are defined between the adjacent teeth 22 on a radially inner side thereof. The slots 23 are formed so as to penetrate the stator core 21 in an axial direction thereof, are each formed into a substantially elliptic shape that is long in a radial direction of the stator core 21 as seen in the axial direction and each has an opening portion 24 that opens to an inner circumferential surface of the stator core 21.

[1-2 Slot Coil]

Figure 5A:
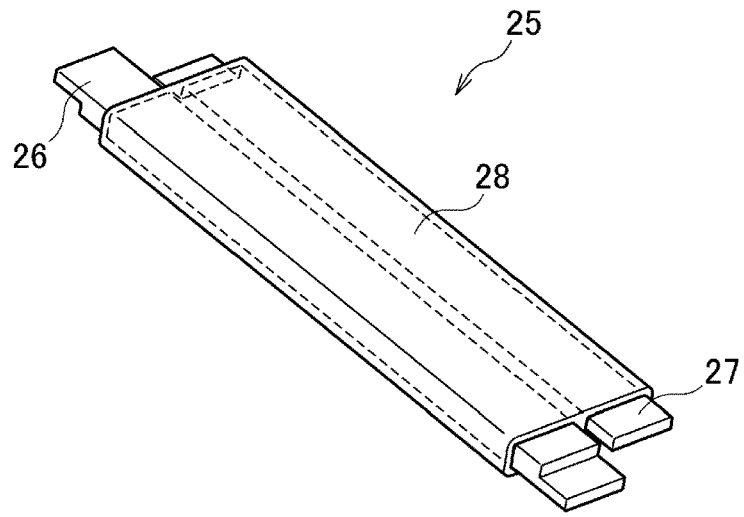
FIG. 5A is a perspective view of a slot coil.
Figure 5B:
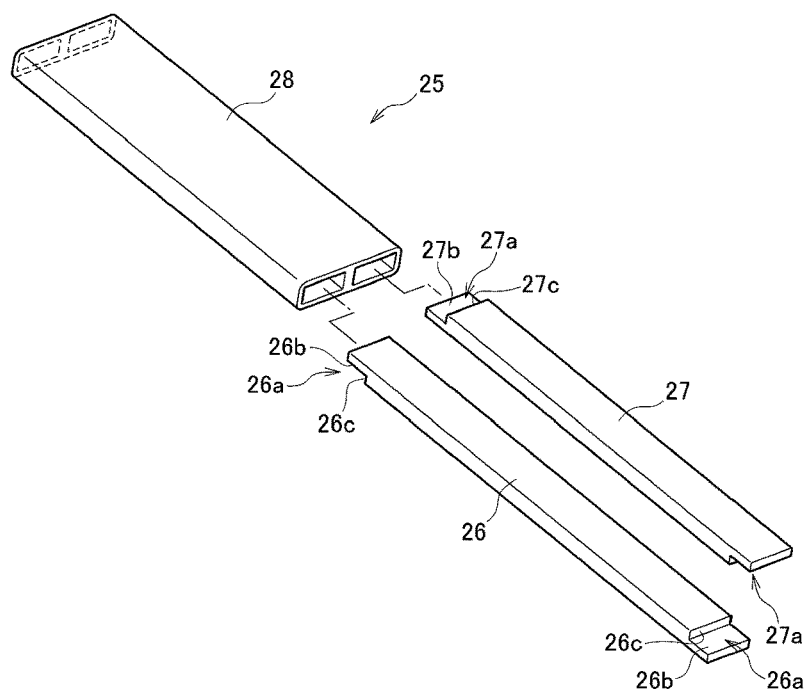
FIG. 5B is an exploded perspective view of the slot coil.
Figure 6:
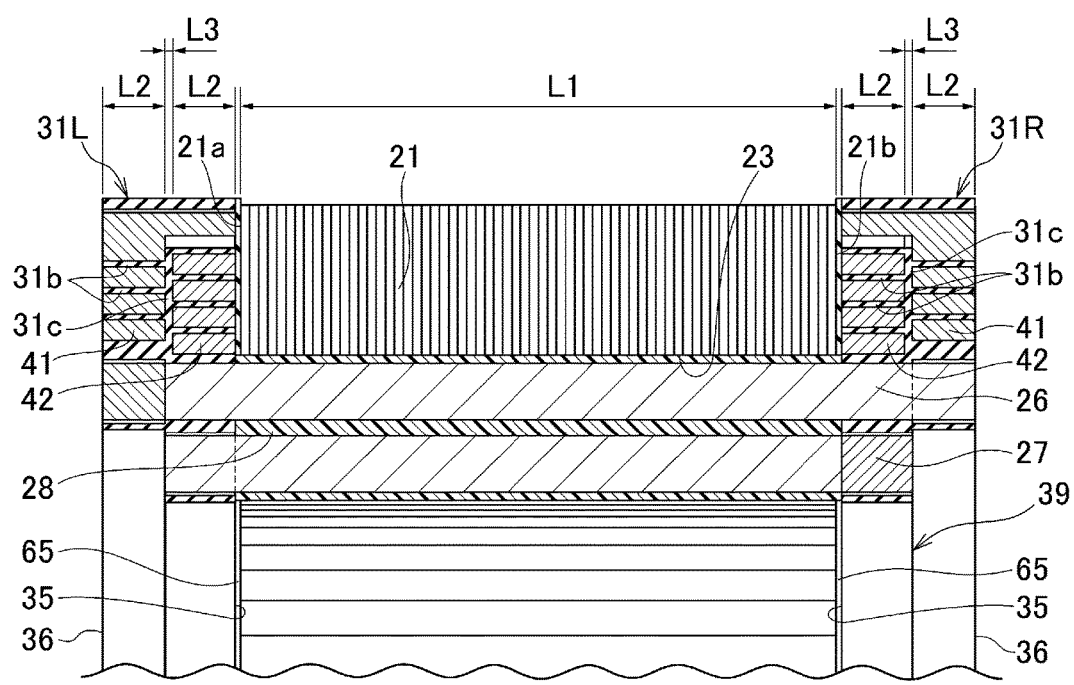
FIG. 6 is a vertical sectional view showing part of the stator shown in FIG. 1.

Referring also to FIGS. 5A, 5B and 6, the slot coil 25 inserted into each slot 23 has a radially outer slot coil 26 and a radially inner slot coil 27 which are both a plate conductor having a rectangular section, and the radially outer slot coil 26 and the radially inner slot coil 27 are surrounded therearound excluding axial end portions thereof by an insulation material 28 having a rectangular section which is an injection molded resin, whereby the radially outer slot coil 26 and the radially inner slot coil 27 are formed into an integral unit. Specifically speaking, the radially outer slot coil 26 is set at a length (L1+4×L2) that is substantially equal to a sum of an axial width L1 of the stator core 21 and a total axial width (4×L2) of four connection coils 40, which will be described later, and axial end portions are exposed individually from the insulation material 28 by a length (2×L2) substantially equaling a total axial width of two connection coils 40. Further, at one axial end portion of the radially outer slot coil 26, a surface oriented in one circumferential direction is cut out by a length (L2) equalling the axial width of one connection coil 40 in a step-like fashion so as to reduce a thickness of the one axial end portion, whereby a step portion 26a is formed on the one axial end portion, while at the other axial end portion of the radially outer slot coil 26, a surface oriented in the other circumferential direction is cut out by the length (L2) equalling the axial width of one connection coil 40 in a step-like fashion so as to reduce a thickness of the other axial end portion, whereby a step portion 26a is formed on the other axial end portion.

The radially inner slot coil 27 is set at a length (L1+2×L2) that is substantially equal to a sum of the axial width (L1) of the stator core 21 and a total axial width (2×L2) of two connection coils 40, which will be described later, and axial end portions are exposed individually from the insulation material 28 by the length (L2) substantially equaling an axial width of one connection coil 40. Further, at one axial end portion of the radially inner slot coil 27, a surface oriented in the other circumferential direction is cut out by a length (L2) equalling the axial width of one connection coil 40 in a step-like fashion so as to reduce a thickness of the one axial end portion, whereby a step portion 27a is formed on the one axial end portion, while at the other axial end portion of the radially inner slot coil 27, a surface oriented in the one circumferential direction is cut out by the length (L2) equalling the axial width of one connection coil 40 in a step-like fashion so as to reduce a thickness of the other axial end portion, whereby a step portion 27a is formed on the other axial end portion.

In other words, in the slot coil 25, the radially outer slot coil 26 is exposed from the insulation material 28 at the axial ends thereof by the length (2×L2) substantially equalling the total axial width of two connection coils 40, and the radially inner slot coil 27 is exposed from the insulation material 28 at the axial ends thereof by the length (L2) equalling the axial width of one connection coil 40. The step portions 26a, 27a are formed at the distal end portions of the radially outer slot coil 26 and the radially inner slot coil 27 by the length (L2) equalling the axial width of one connection coil 40 so as to be oriented in the opposite circumferential directions. In addition, the step portions 26a of the radially outer slot coil 26 and the step portions 27a of the radially inner slot coil 27 are formed so as to be oriented in the opposite circumferential directions at the one axial end portion and the other axial end portion.

The plural (108 in the illustrated embodiment) slot coils 25 each made up of the radially outer slot coil 26 and the radially inner slot coil 27 are disposed along the radial directions of the stator core 21 so that the radially outer slot coils 26 are situated on a radially outer side and the radially inner slot coils 27 are situated on a radially inner side. The slot coils 25 are inserted individually into the plural slots 23 formed in the stator core 21 and are aligned in the circumferential direction of the stator core 21, thereby making up the stator core assembly 20.

The radially outer slot coil 26 is inserted into the slot 23 so that the distal end portions project individually from both end faces 21a, 21b of the stator core 21 by the distance (2×L2) that is substantially equal to the total axial width of substantially two connection coils 40, and the radially inner slot coil 27 is inserted into the slot 23 so that the distal end portions project individually from both the end faces 21a, 21b of the stator core 21 by the length (L2) that is equal to the axial width of substantially one connection coil 40.

The insulation material 28 that covers the radially outer slot coil 26 and the radially inner slot coil 27 is interposed between both the slot coils 26, 27 and the slot 23 in the stator core 21 so as to ensure the insulation between the radially outer and inner slot coils 26, 27 and the stator core 21.

The insulation material 28 that covers the radially outer slot coil 26 and the radially inner slot coil 27 has substantially the same shape as that of the slot 23 but is slightly greater than the slot 23, and the insulation material 28 can easily be fixed into the slot 23 through press fitting. Since the radially outer slot coil 26 and the radially inner slot coil 27 are thicker than the conventional coils that are made up of the winding wires wound around the teeth, the space factor of the slot 23 is advantageously improved.

[2 Base Plate Assembly]

Figure 3:
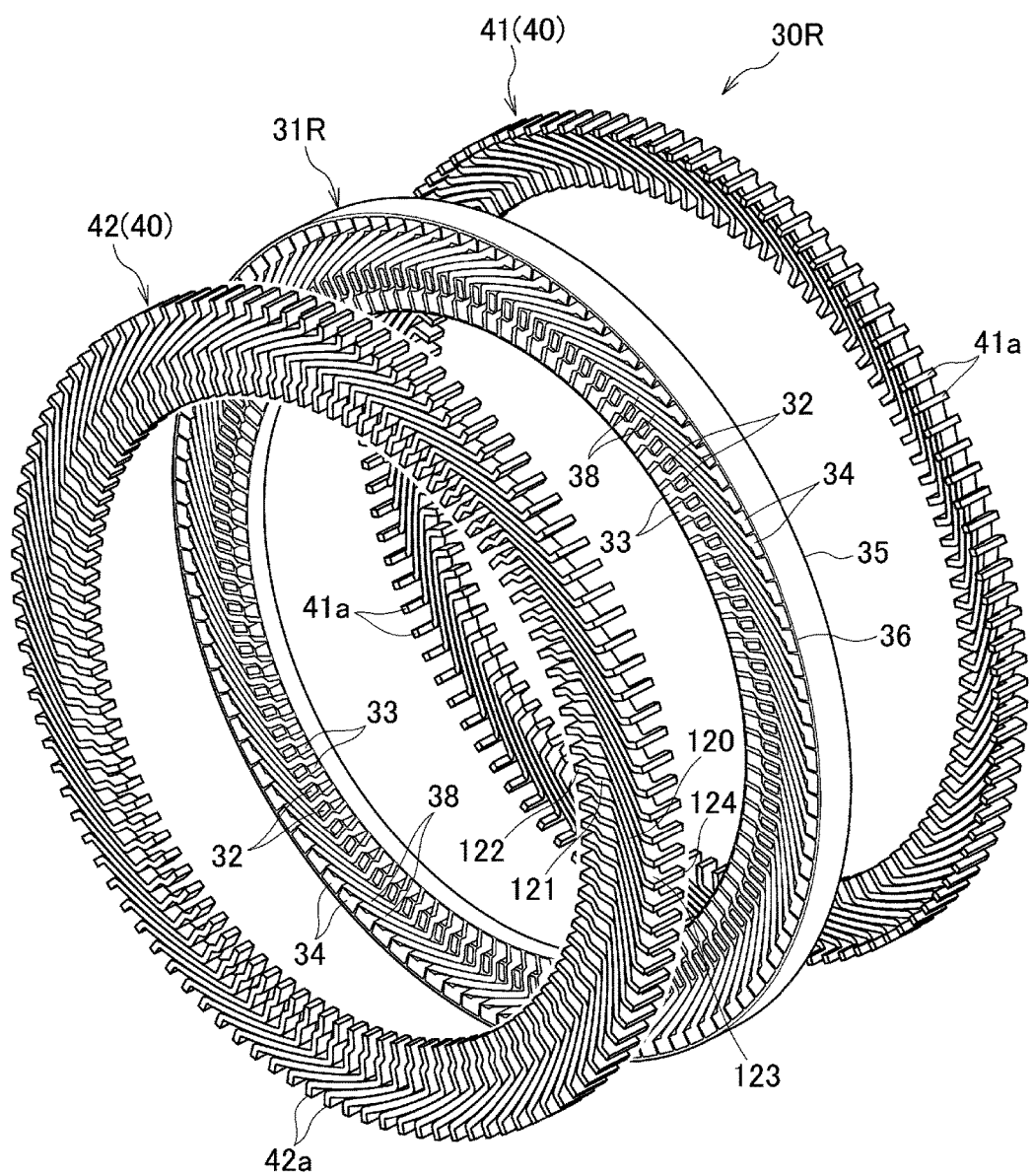
FIG. 3 is an exploded perspective view of one of base plate assemblies shown in FIG. 2.
Figure 4:
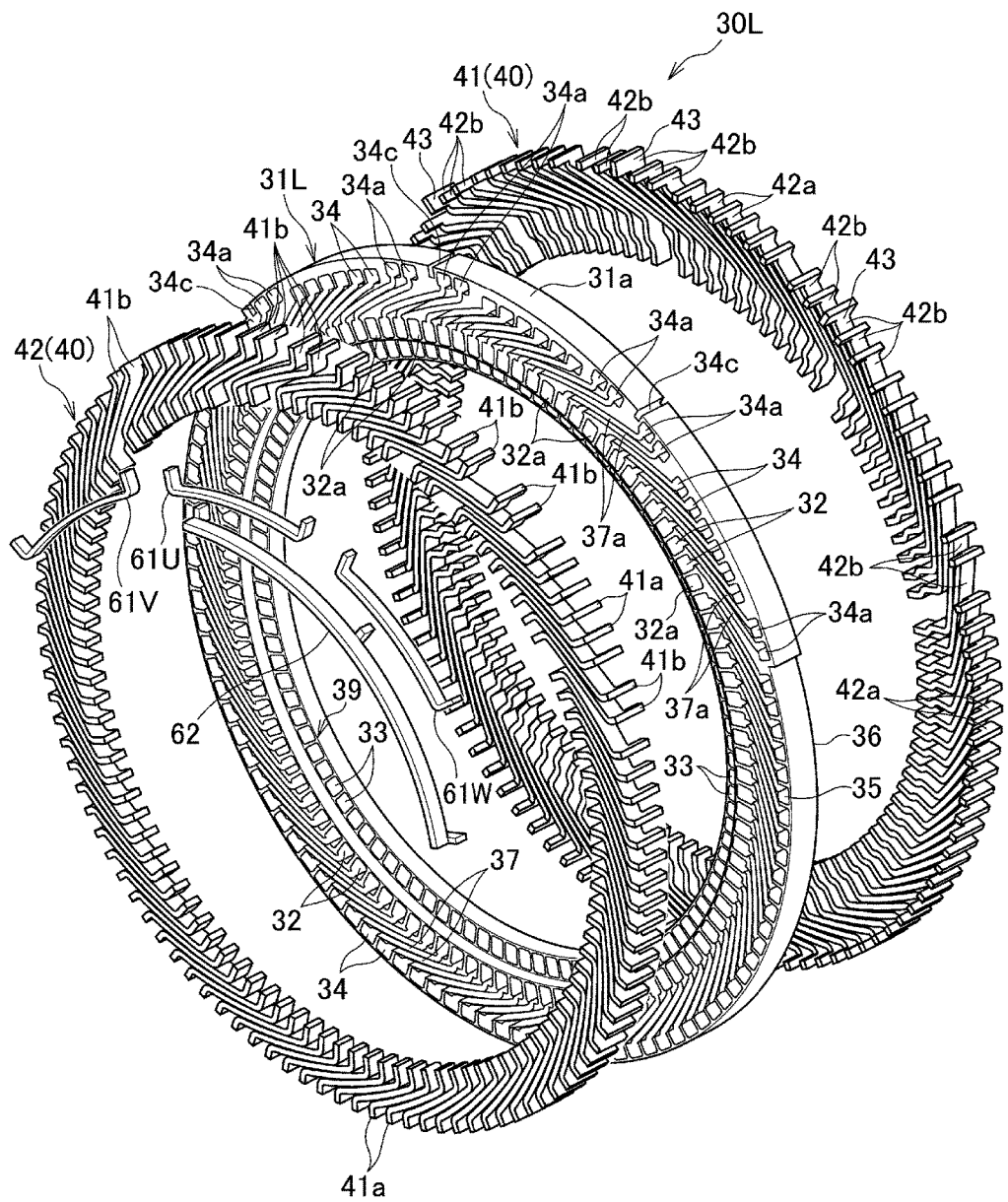
FIG. 4 is an exploded perspective view of the other of the base plate assemblies shown in FIG. 2.

The base plate assemblies 30L, 30R that are disposed individually at the ends of the stator core assembly 20 include base plates 31L, 31R and plural connection coils 40, as shown in FIGS. 3 and 4.

[2-1 Base Plates]

The base plates 31L, 31R are substantially annular members that are formed from a resin having insulation properties (a non-magnetic material) and which have a bore diameter and an outside diameter that are substantially the same as those of the stator core 21.

As shown in FIG. 3, a plurality (108 in the illustrated embodiment) of radially outer through holes 32 and a plurality (108 in the illustrated embodiment) of radially inner through holes 33 are formed at equal intervals in a radially inner side of the base plate 31R so as to correspond to the radially outer slot coils 26 and the radially inner slot coils 27, respectively, of the slot coils 25 that are inserted into the slots 23 in the stator core 21. The radially outer through holes 32 and the radially inner through holes 33 penetrate the base plate 31R to establish a communication between an outer surface 35 and an inner surface 36 of the base plate 31R. By assembling the base plate assembly 30R to the stator core assembly 20, the distal end portions of the radially outer slot coils 26 that are inserted into the slots 23 in the stator core 21 and which project from the end faces 21a, 21b of the stator core 21 are disposed in the radially outer through holes 32 of the base plate 31R and the distal end portions of the radially inner slot coils 27 that are inserted into the slots 23 in the stator core 21 and which project from the end faces 21a, 21b of the stator core 21 are disposed in the radially inner through holes 33 of the base plate 31R. In the radially outer through holes 32, opening portions that open to the inner surface 36 are smaller than opening portions that open to the outer surface 35, and are caused to penetrate the base plate 31R at only portions where the distal end portions of the radially outer slot coils 26 pass through.

Figure 7A:
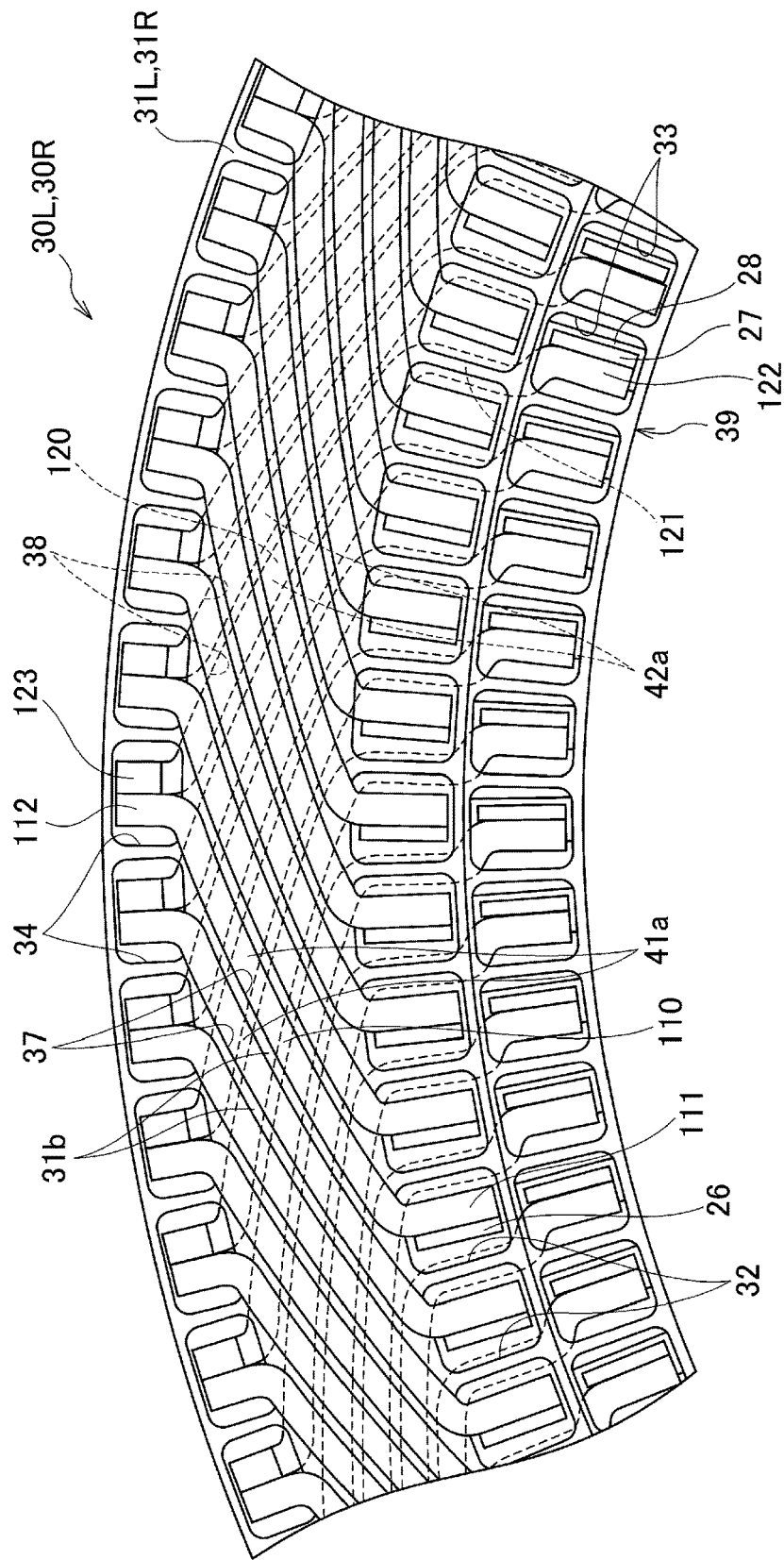
FIG. 7A is a front view showing part of the base plate assemblies shown in FIGS. 3 and 4.

Further, a plurality (108 in this illustrated embodiment) of outer circumferential holes 34 are formed at equal intervals in a radially outer side of the base plate 31R so as to penetrate the base plate 31R, whereby a communication is established between the outer surface 35 and the inner surface 36. As shown in FIG. 7A, a plurality (108 in this illustrated embodiment) of outer surface grooves 37 and a plurality (108 in this illustrated embodiment) of inner surface grooves 38 are formed on the outer surface 35 and the inner surface 36 of the base plate 31R, respectively, so as to extend in circumferential directions along involute curves in such a way as to lie close to one another. The outer surface grooves 37 and the inner surface grooves 38 have a substantially U-shaped cross section and open to the outer surface 35 and the inner surface 36, respectively.

The base plate 31L basically has a similar construction to that of the base plate 31R. A plurality (108 in the illustrated embodiment) of radially outer through holes 32 and a plurality (108 in the illustrated embodiment) of radially inner through holes 33 are also formed at equal intervals in a radially inner side of the base plate 31L so as to correspond to the radially outer slot coils 26 and the radially inner slot coils 27, respectively, of the slot coils 25 that are inserted into the slots 23 in the stator core 21. The radially outer through holes 32 and the radially inner through holes 33 penetrate the base plate 31L so as to establish a communication between the outer surface 35 and the inner surface 36 of the base plate 31R.

On the other hand, a deployed portion 31a that extends into a fan shape is provided on a radially outer side of an upper portion in the figure on a radially outer side of the base plate 31L, and plural outer circumferential holes 34 are formed at equal intervals in other portions than the deployed portion 31a so as to penetrate the base plate 31L to thereby establish a communication between the outer surface 35 and the inner surface 36. In the deployed portion 31a, two sets of two outer circumferential holes 34a, each having an opening area that is slightly greater than that of the other outer circumferential holes 34, are formed for each of U, V and W phases in such a way as to hold six outer circumferential holes 34 therebetween, and input terminal notched portions 34c are formed at equal intervals one for each phase. Input terminal portions 43 of three inner connection coils 42b with which the input terminal portions 43 are formed integrally are disposed individually in the input terminal notched portions 34c. The inner connection coils 42b will be described later.

On a radially inner side of the deployed portion 31a of the base plate 31L, a set of two radially outer through holes 32a, each having a busbar notched portion (not shown) formed on an inner circumferential side thereof, are formed for each phase in such a way as to hold eight radially outer through holes 32 therebetween. Further, radially inner through hole 33a having a middle point busbar notched portion (not shown) formed on an inner circumferential side thereof are formed for each phase in such a way as to hold eleven radially inner through holes 33 therebetween. Busbar connecting portions of busbars 61U, 61V, 61W that connect coils of the same phase together are disposed in the busbar notched portions, and middle point busbar connecting portions of middle point busbars 62 that connect coils of U, V, W phases together are disposed in the middle point busbar notched portions.

Radially outer end portions 112 of outer connection coils 41 and radially outer end portions 123 of inner connection coils 42, which will be described later, are disposed in the outer circumferential holes 34, 34a of the base plates 31L, 31R. The radially outer through holes 32, 32a, the radially inner through holes 33, 33a and the outer circumferential holes 34, 34a exhibit a rectangular shape as seen from the axial direction and have a space greater than the coil member (the radially outer slot coil 26, the radially inner slot coil 27, the outer connection coil 41) that is disposed in an interior thereof.

In addition, a plurality (102 in the outer surface 35 in this illustrated embodiment) of outer surface grooves 37 and a plurality (102 in the inner surface 36 in this illustrated embodiment) of inner surface grooves 38 are formed also on the outer surface 35 and the inner surface 36 of the base plate 31L, respectively, so as to extend in circumferential directions along involute curves in such a way as to lie close to one another. The outer surface grooves 37 and the inner surface grooves 38 have a substantially U-shaped cross section and open to the outer surface 35 and the inner surface 36, respectively. In the deployed portion 31*a* of the base plate 31L, a total of twelve, four for each phase, outer surface grooves 37*a* that are formed slightly longer than the other outer surface grooves 37 are formed on the outer surface 35, and a total of fifteen, five for each phase, inner surface grooves 38*a* that are formed slightly longer than the other inner surface grooves 38 are formed on the inner surface 36. The number of outer surface grooves 37, 37*a* is smaller by six, two for each phase, than the number of outer surface grooves 37 that are formed on the base plate 31R, and the number of inner surface grooves 38, 38*a* is smaller by three, one for each phase, than the number of inner surface grooves 38 that are formed on the base plate 31R. Instead, the coils of the same phases are connected together by the busbars 61U, 61V, 61W and the coils of different phases are connected together by the middle point busbars 62. In these base plates 31L, 31R, as shown in FIG. 6, the outer surface grooves 37, 37*a* that lie adjacent to one another and the inner surface grooves 38, 38*a* that lie adjacent to one another are isolated by walls 31*b* that rise from the base plate 31L, and the outer surface grooves 37, 37*a* and the inner surface grooves 38, 38*a* that face each other in the axial direction are isolated by partition walls 31*c*, whereby the individual grooves are electrically insulated from one another.

In the base plates 31L, 31R, a radially innermost portion 39 where the radially inner through holes 33 are formed is set at a length (L2) that is equal to an axial width of one connection coil 40, and the other area than the radially innermost portion 39 where the radially outer through holes 32 and the outer circumferential holes 34 are formed is set at an axial width (2×L2+L3) that is substantially equal to a sum of a total axial width (2×L2) of two connection coils 40 and a thickness (L3) of the partition wall 31*c*.

Figure 7B:
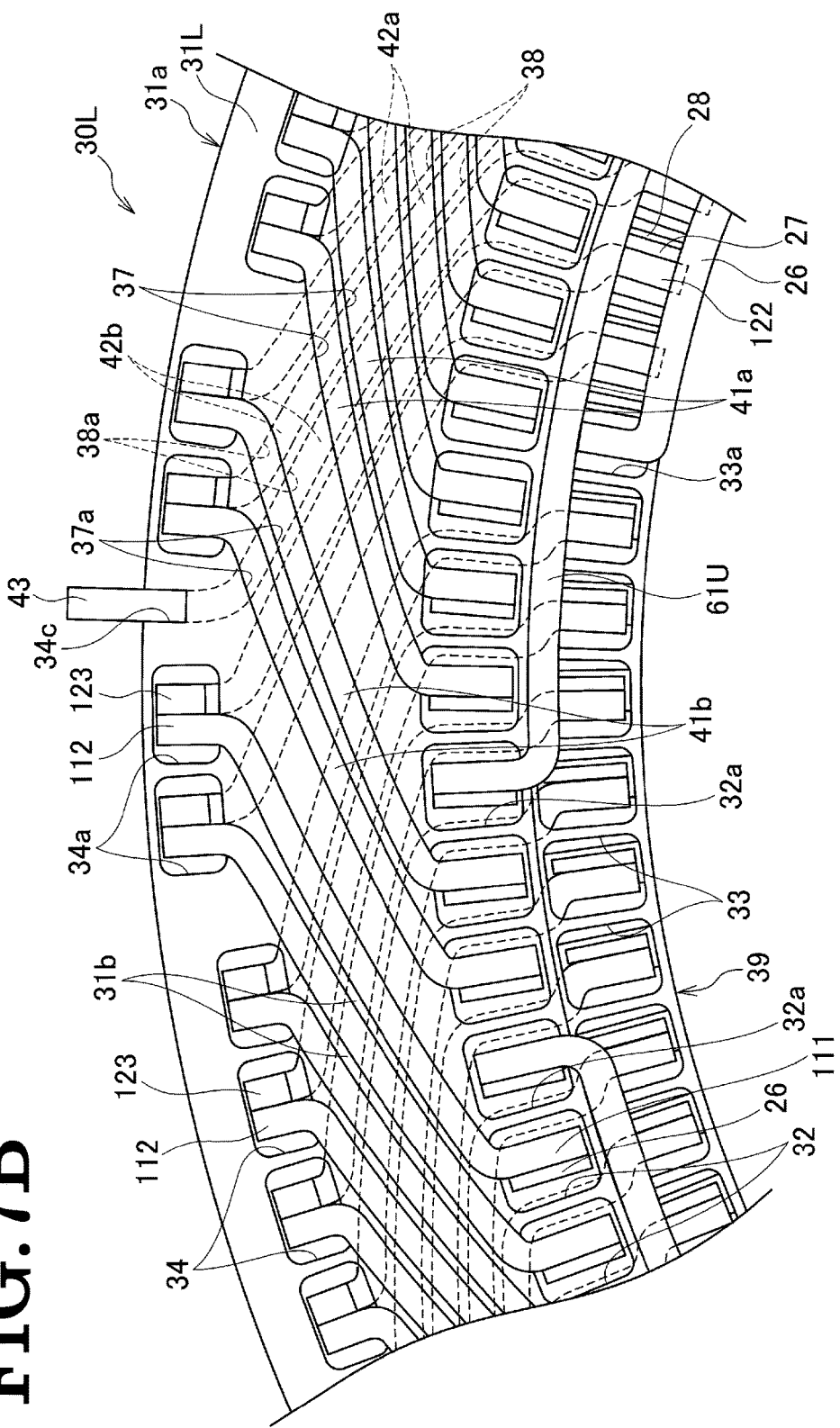
FIG. 7B is a front view showing part of the base plate assembly shown in FIG. 4.

In the base plate assemblies 30L, 30R, as shown in FIG. 7A, each of the outer surface grooves 37 of the base plates 31L, 31R is formed to be curved along the involute curve so as to connect the outer circumferential hole 34 and the radially outer through hole 32 that is spaced a predetermined angle in a counterclockwise direction from the outer circumferential hole 34, when seen from the front. As shown in FIG. 7B, however, in the plural outer surface grooves 37 on the base plate 31L, each of the twelve outer surface grooves 37*a* that extends towards the deployed portion 31*a* is formed to be curved along the involute curve so as to connect the outer circumferential hole 34*a* and the radially outer through hole 32 that is spaced an angle that is slightly greater than the predetermined angle in the counterclockwise direction from the outer circumferential hole 34*a*. FIGS. 7A, 7B show a state in which the outer connection coils 41 and the inner connection coils 42 described later are accommodated in the outer surface grooves 37 and the inner surface grooves 38, respectively.

Each of the inner surface grooves 38 of the base plates 31L, 31R is formed to be curved while avoiding the radially outer through hole 32 so as to connect the outer circumferential hole 34 and the radially inner through hole 33 that are spaced a predetermined angle in the counterclockwise direction (in a clockwise direction as seen from the side shown in FIG. 7A) from the outer circumferential hole 34, when seen from the front. As shown in FIG. 7B, however, in the plural inner surface grooves 38 on the base plate 31L, each of the twelve inner surface grooves 38*a* that extends towards the deployed portion 31*a* of the base plate 31L is formed to be curved along the involute curve so as to connect the outer circumferential hole 34*a* and the radially inner through hole 33 that is spaced an angle that is slightly greater than the predetermined angle in the counterclockwise direction from the outer circumferential hole 34*a*. The remaining three inner surface grooves 38*a* in the fifteen inner surface grooves 38*a* communicate with the input terminal notched portions 34*c*.

Namely, as shown in FIG. 7, the radially outer through holes 32 and the radially inner through holes 33 are connected via the outer circumferential holes 34 to which the outer surface grooves 37 and the inner surface grooves 38 continue commonly or the outer circumferential holes 34*a* to which the outer surface grooves 37*a* and the inner surface grooves 38*a* continue commonly.

[2-2 Connection Coils]

The connection coils 40 are formed of a conductive material such as copper into a plate shape and include the outer connection coils 41 (41*a*, 41*b*) that are inserted individually into the outer surface grooves 37, 37*a* and the inner connection coils 42 (42*a*, 42*b*) that are inserted individually into the inner surface grooves 38. When referred to herein, the outer connection coils 41 mean the connection coils 40 that come to lie on an axially outer side of the stator 10 and the inner connection coils 42 mean the connection coils 40 that come to lie on an axially inner side of the stator core 10 when the stator core assembly 20 and the base plate assemblies 30L, 30R are assembled together.

Figure 13A:
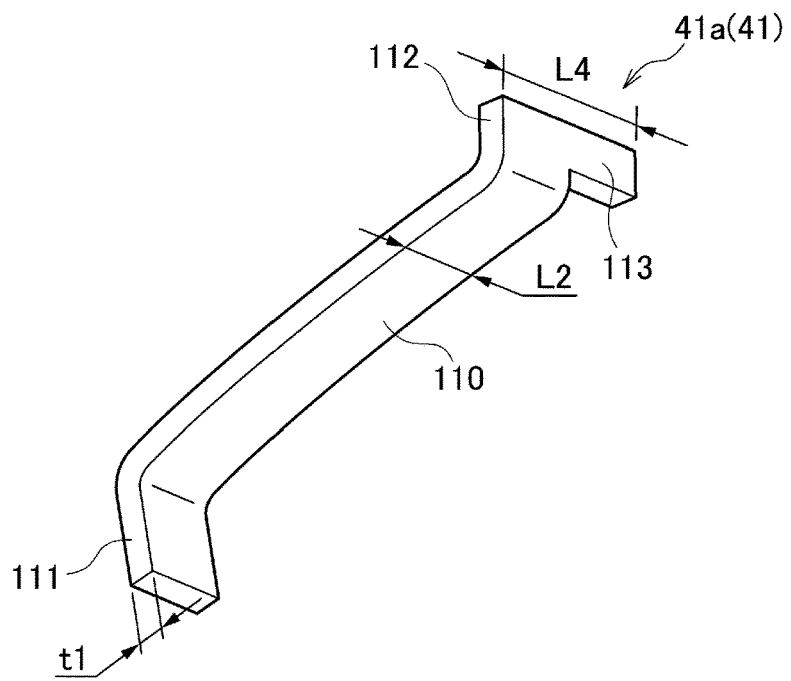
FIG. 13A is a perspective view of an outer connection coil.

As shown in FIG. 13A, the outer connection coil 41*a* is a plate conductor having a uniform thickness and a rectangular cross section. A radially inner end portion 111 is bent radially from an outer connection coil main body 110 that is formed so as to extend along an involute curve having the same shape as that of the outer surface groove 37, and a radially outer end portion 112 is also bent radially from the outer connection coil main body 110. An outer connection coil extending portion 113 is formed at the radially outer end portion 112 of the outer connection coil 41*a* so as to extend axially inwards. Axial widths (L2) of the outer connection coil main body 110 and the radially inner end portion 111 are equal to a depth of the outer surface groove 37, and an axial width (L4) of the outer connection coil extending portion 113 is set at an axial width (2×L2+L3) that is equal to a sum of the depths of the outer surface groove 37 and the inner surface groove 38 and a thickness (L3) of the partition wall 31*c*. In addition, the twelve outer connection coils 41*b* have the same construction as that of the outer connection coil 41*a* except that an outer connection coil main body 110 is formed so as to be curved into the same shape as that of the outer surface groove 37*a*.

Figure 13B:
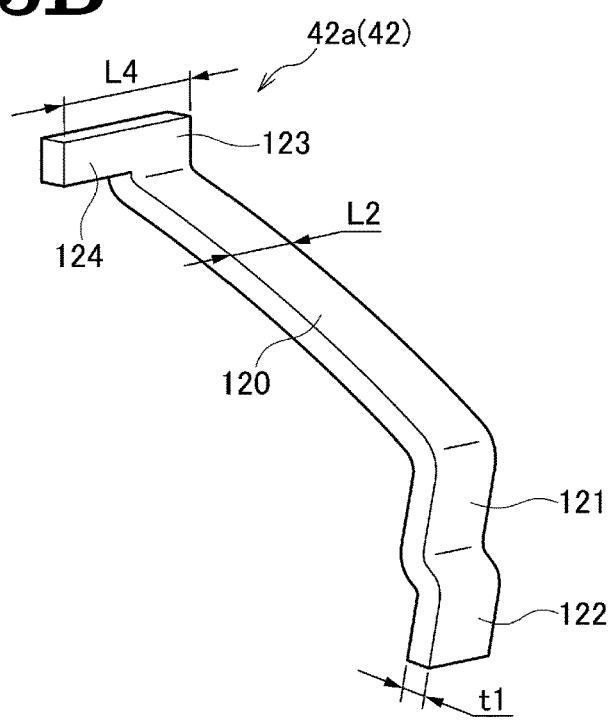
FIG. 13B is a perspective view of an inner connection coil.

As shown in FIG. 13B, the inner connection coil 42*a* is a plate conductor having a uniform thickness and a rectangular cross section. A radially inner end portion 122 is bent radially from an inner connection coil main body 120 that is formed so as to extend along an involute curve having the same shape as that of the inner surface groove 38 by way of a bypass portion 121 that is formed so as to bypass the radially outer through hole 32, and a radially outer end portion 123 is also bent radially from the inner connection coil main body 120. An inner connection coil extending portion 124 is formed at the radially outer end portion 123 of the inner connection coil 42*a* so as to extend axially outwards. Axial widths (L2) of the inner connection coil main body 120 and the radially inner end portion 122 are equal to a depth of the inner surface groove 38, and an axial width (L4) of the inner connection coil extending portion 124 is set at an axial width (2×L2+L3) that is equal to a sum of the depths of the outer surface groove 37 and the inner surface groove 38 and the thickness (L3) of the partition wall 31c. In addition, the fifteen inner connection coils 42b that are inserted into the inner surface grooves 38a basically have the same configuration as that of the inner connection coil 42a except that the inner connection coil main body 120 is formed so as to be curved into the same shape as that of the inner surface groove 38a. However, in the fifteen inner connection coils 42b, the input terminal portions 43 configured for connection to external equipment are formed integrally on the radially outer end portions 123 so as to fit in the input terminal notched portions 34c on the three inner connection coils 42b that are disposed in the positions corresponding to the input terminal notched portions 34c.

The outer connection coil 41 and the inner connection coil 42 have the same thickness (t1), and the thickness (t1) of the outer connection coil 41 and the inner connection coil 42 is set at a thickness that is the same as the thickness of the radially outer slot coil 26 and the radially inner slot coil 27 which have the same thickness. The thickness (t1) of the outer connection coil 41 and the inner connection coil 42 is smaller than the axial width (L2) of the outer connection coil 41 and the inner connection coil 42 (the outer connection coil main body 110 and the inner connection coil main body 120). The aforesaid "the axial width of x connection coils 40 (x=1, 2, 4)" means the axial width of the outer connection coil main body 110 and the inner connection coil main body 120. "Substantially equal" represents an expression including an error equaling the thickness of the partition wall 31c. The thickness of the insulation sheet 65 is not taken into consideration.

The outer connection coils 41, the inner connection coils 42 and the slot coils 25 can be formed into the desired axial widths and desired planar shapes by pressing and punching a metallic sheet (for example, a copper sheet) having a predetermined thickness (t1). Further, in the outer connection coil 41, by bending the pressed and punched sheet conductor, the outer connection coil main body 110 that is formed to extend along the involute curve having the same shape as that of the outer surface grooves 37, 37a, the radially inner end portion 111 and the radially outer end portion 112 that are connected from the outer connection coil main body 110 while being bent can be formed as shown in FIG. 13A. Similarly, in the inner connection coil 42, by bending the pressed and punched sheet conductor, the inner connection coil main body 120 that is formed to extend along the involute curve having the same shape as that of the inner surface grooves 38, 38a, the radially inner end portion 122 and the radially outer end portion 123 that are connected from the inner connection coil main body 120 while being bent can be formed as shown in FIG. 13B.

Figure 15:
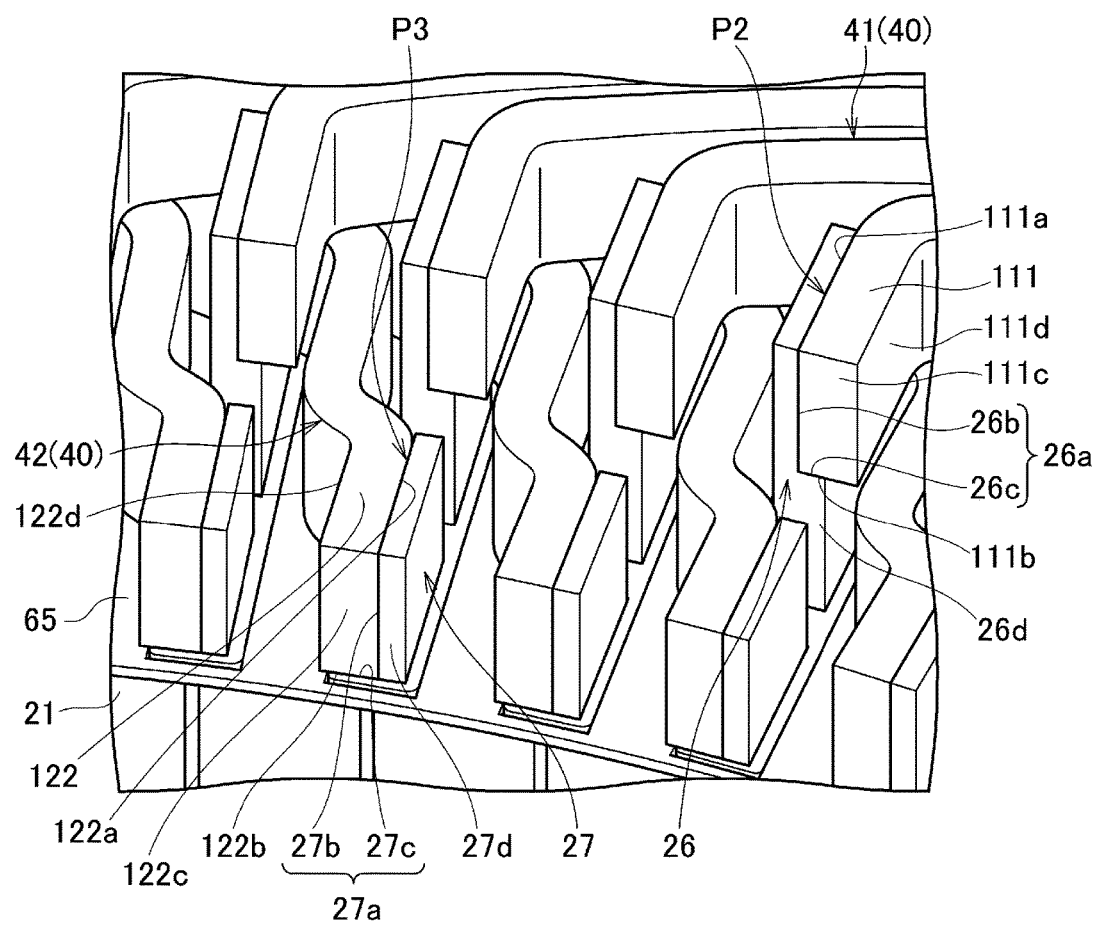
FIG. 15 is a perspective view illustrating the joining of a radially inner end portion of the outer connection coil and a step portion of a radially outer slot coil and the joining of a radially inner end portion of the inner connection coil and a step portion of a radially inner slot coil.

The outer connection coils 41a, 41b are inserted into the outer surface grooves 37, 37a of the base plates 31L, 31R. The radially inner end portions 111 of the outer connection coils 41 are disposed in the radially outer through holes 32 and are brought into abutment with the step portions 26a of the radially outer slot coils 26 that are inserted into the slots 23 in the stator core 21 and that are similarly disposed in the radially outer through holes 32 when assembling the stator core assembly 20 and the base plate assemblies 30L, 30R together, as shown in FIG. 15.

The inner connection coils 42a, 42b are inserted into the inner surface grooves 38, 38a of the base plates 31L, 31R. The radially inner end portions 122 of the inner connection coils 42a, 42b are disposed in the radially inner through holes 33 and are brought into abutment with the step portions 27a of the radially inner slot coils 27 that are inserted into the slots 23 in the stator core 21 and that are similarly disposed in the radially inner through holes 33 when assembling the stator core assembly 20 and the base plate assemblies 30L, 30R together, as shown in FIG. 15.

Figure 14:
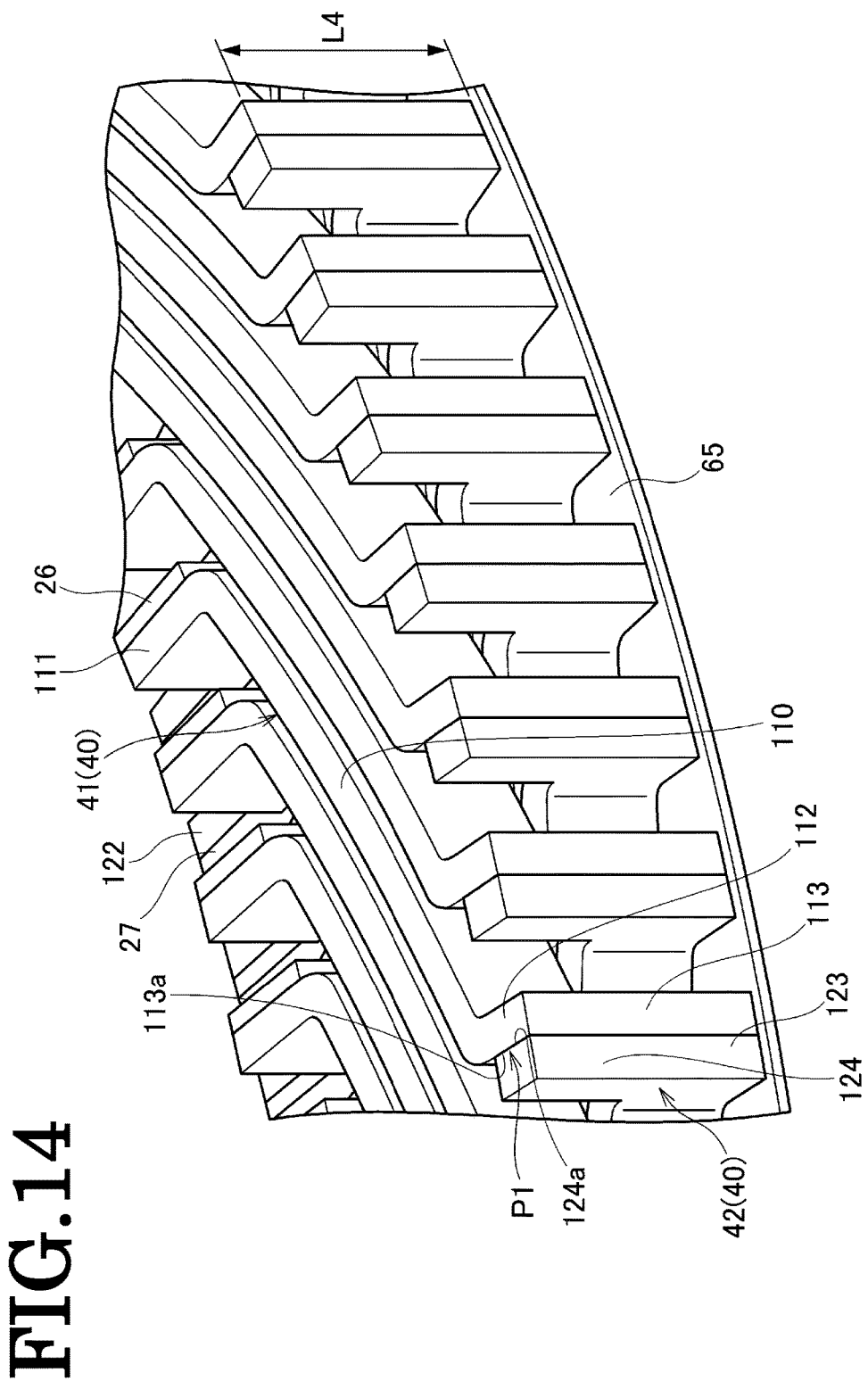
FIG. 14 is a perspective view illustrating the joining of an outer connection coil extending portion and an inner connection coil extending portion.

The radially outer end portions 112 of the outer connection coils 41a, 41b and the radially outer end portions 123 of the inner connection coils 42a, 42b are both disposed in the outer circumferential holes 34, whereby side surfaces 113a of the outer connection coil extending portions 113 that are oriented in the one circumferential direction and side surfaces 124a of the inner coil extending portions 124 that are oriented in the other circumferential direction are brought into abutment with each other over the whole surface in the radial and axial directions, as shown in FIG. 14.

[3 Joining]

The radially inner end portions 111 of the outer connection coils 41 and the step portions 26a of the radially outer slot coils 26 which are brought into abutment with each other, the radially inner end portions 122 of the inner connection coils 42 and the step portions 27a of the radially inner slot coils 27 which are brought into abutment with each other, and the outer connection coil extending portions 113 of the outer connection coils 41 and the inner connection coil extending portions 124 of the inner connection coils 42 which are brought into abutment with each other are joined together on planar plate surfaces thereof that intersect a thickness direction through welding, preferably through laser welding. In the following description, joining will be described as being carried out using laser welding.

As shown in FIG. 14, in the outer connection coil extending portions 113 and the inner connection coil extending portions 124, the side surfaces 113a of the outer connection coil extending portions 113 that are oriented in the one circumferential direction and the side surfaces 124a of the inner connection coil extending portions 124 that are oriented in the other circumferential direction are made to face each other for abutment, both of which are planar plate surfaces that intersect the thickness direction and which follow the axial direction, whereby the plate surfaces are brought into surface contact with each other over the whole surface in the radial and axial directions. With both the side surfaces 113a, 124a brought into surface contact with each other, laser welding is executed along abutment planes P1 that extend in the radial direction from axially outer sides of the outer circumferential holes 34, whereby the side surfaces 113a, 124a are joined together on the abutment planes P1. By adopting this configuration, the radially outer end portions 112 of the outer connection coils 41 and the radially outer end portions 123 of the inner connection coils 42 which are situated in the same outer circumferential holes 34 are electrically connected together, whereby the base plate assemblies 30L, 30R are made up. In FIG. 14, the base plates 31L, 31R are omitted. This will also be true in FIGS. 15 and 16 which will be described below.

Figure 16:
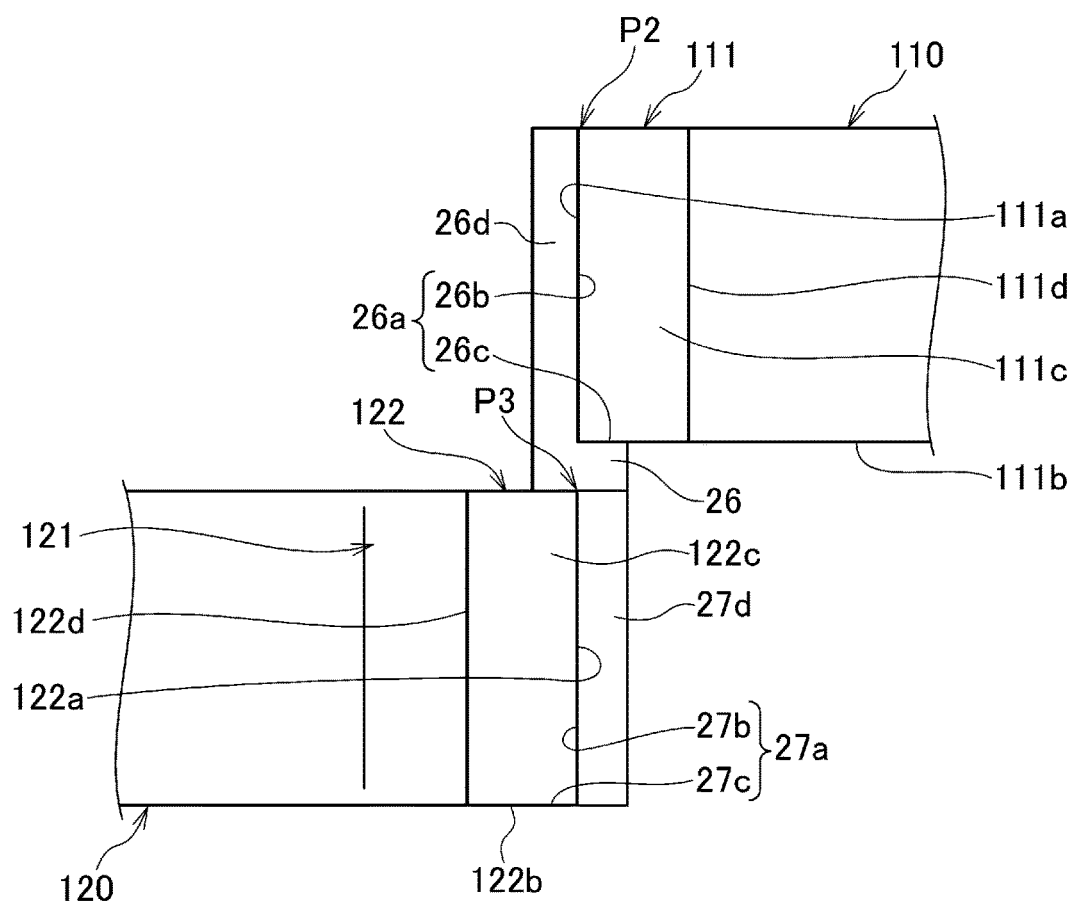
FIG. 16 is a view of one slot coil inserted into one of the slots shown in FIG. 15 as seen from a radially inner side.

As shown in FIGS. 15 and 16, in assembling together the stator core assembly 20 and the base plate assemblies 30L, 30R, the base plates 31L, 31R are assembled to the stator core assembly 20 in the axial direction with the insulation sheets 65 interposed therebetween while aligning the base plate assemblies 30L, 30R relatively with the stator core assembly 20 in the circumferential direction, whereby the radially inner end portions 111 of the outer connection coils 41 are brought into abutment with the step portions 26a of the radially outer slot coils 26 and the radially inner end portions 122 of the inner connection coils 42 are brought into abutment with the step portions 27a of the radially inner slot coils 27, whereby the stator core assembly 20 and the base plate assemblies 30L, 30R are positioned.

The step portion 26a of the radially outer slot coil 26 is made up of a side surface 26b that is a planar plate surface and which is oriented in the one circumferential direction and a bottom surface 26c, and a circumferential width of the bottom surface 26c is set at a length (t1/2) that is about half the thickness (t1) of the radially outer slot coil 26. In the radially inner end portion 111 of the outer connection coil 41 that is brought into abutment with the step portion 26a of the radially outer slot coil 26, a side surface 111a that is a planar flat surface and which is oriented in the other circumferential direction is brought into abutment with the side surface 26b of the step portion 26a over the whole surface, the bottom surface 111b is brought into abutment with the bottom surface 26c of the step portion 26a over the whole surface, and a radially inner end face 111c is brought into abutment with a radially inner end face 26d of the radially outer slot coil 26 so as to flush with the radially inner end face 26d. The thickness (t1) of the outer connection coil 41 is thicker than the circumferential width (t1/2) of the bottom surface 26c, and therefore, the side surface 111d of the outer connection coil 41 which is oriented in the other circumferential direction protrudes from the bottom surface 26c.

With both the planar side surfaces 111a, 26b that intersect the thickness direction and which follow in the axial direction brought into surface contact with each other, laser welding is executed along abutment planes P2 that extend in the radial direction from axially outer sides of the radially outer through holes 32, whereby the side surfaces 111a, 26b are joined together on the abutment planes P2. In joining both the side surfaces together, the bottom surface 26c of the step portion 26a also functions to prevent the passage of a laser beam.

The step portion 27a of the radially inner slot coil 27 is made up of a side surface 27b that is a planar plate surface and which is oriented in the other circumferential direction and a bottom surface 27c, and a circumferential width of the bottom surface 27c is set at a length (t1/2) that is about half the thickness (t1) of the radially inner slot coil 27. In the radially inner end portion 122 of the inner connection coil 42 that is brought into abutment with the step portion 27a of the radially inner slot coil 27, a side surface 122a that is a planar flat surface and which is oriented in the one circumferential direction is brought into abutment with the side surface 27b of the step portion 27a over the whole surface, a bottom surface 122b is brought into abutment with the bottom surface 27c of the step portion 27a over the whole surface, and a radially inner end face 122c is brought into abutment with a radially inner end face 27d of the radially inner slot coil 27 so as to flush with the radially inner end face 27d. The thickness (t1) of the inner connection coil 42 is thicker than the circumferential width (t1/2) of the bottom surface 27c, and therefore, the side surface 122d of the inner connection coil 42 which is oriented in the one circumferential direction protrudes from the bottom surface 27c.

With both the planar side surfaces 122a, 27b that intersect the thickness direction and which follow in the axial direction brought into surface contact with each other, laser welding is executed along abutment planes P3 that extend in the radial direction from axially outer sides of the radially inner through holes 33, whereby the side surfaces 122a, 27b are joined together on the abutment planes P3. In joining both the side surfaces together, the bottom surface 27c of the step portion 27a also functions to prevent the passage of a laser beam. The radially innermost portions 39 of the base plates 31L, 31R where the radially inner through holes 33 are formed are set at an axial width that corresponds to the depth of the inner surface grooves 38, 38a, and therefore, a laser gun does not have to be inserted deeply into the radially inner through holes 33.

Similarly, the step portions 26a of the radially outer slot coils 26 that are disposed in the radially outer through holes 32a where the busbar notched portions are formed and the busbar connecting portions of the busbars 61U, 61V, 61W that are disposed in the busbar notched portions are laser welded together, and the step portions 27a of the radially inner slot coils 27 that are disposed in the radially inner through holes 33a where the middle point busbar notched portions are formed and the middle point busbar connecting portions of the middle point busbars 62 are laser welded together, whereby the busbars 61U, 61V, 61W and the middle point busbars 62 are joined individually to the radially outer slot coils 26 and the radially inner slot coils 27.

The radially outer through holes 32, 32a, the radially inner through holes 33, 33a and the outer circumferential holes 34 exhibit a rectangular shape as seen from the axial direction and have a space greater than the coil members (the radially outer slot coils 26, the radially inner slot coils 27, the outer connection coils 41, the busbar connecting portions, the middle point busbar connecting portions) that are disposed in the interiors thereof, that is, gaps are provided between the laser beam shining portions and the base plates 31L, 31R, and therefore, the base plates 31L, 31R can be prevented from being damaged by the laser beam.

By joining the constituent members together in the way described above, the base plate assemblies 30L, 30R are assembled to the stator core assembly 20 in such a state that the radially outer slot coils 26 and the radially inner slot coils 27 which are inserted into the slots 23 of the stator core 21 are electrically connected together via the outer connection coils 41 and the inner connection coils 42. The outer connection coils 41 and the inner connection coils 42 make up bridge portions of the coil 50 which connect the slot coils 25 of the same phase (for example, the U phase) together.

Figure 10:
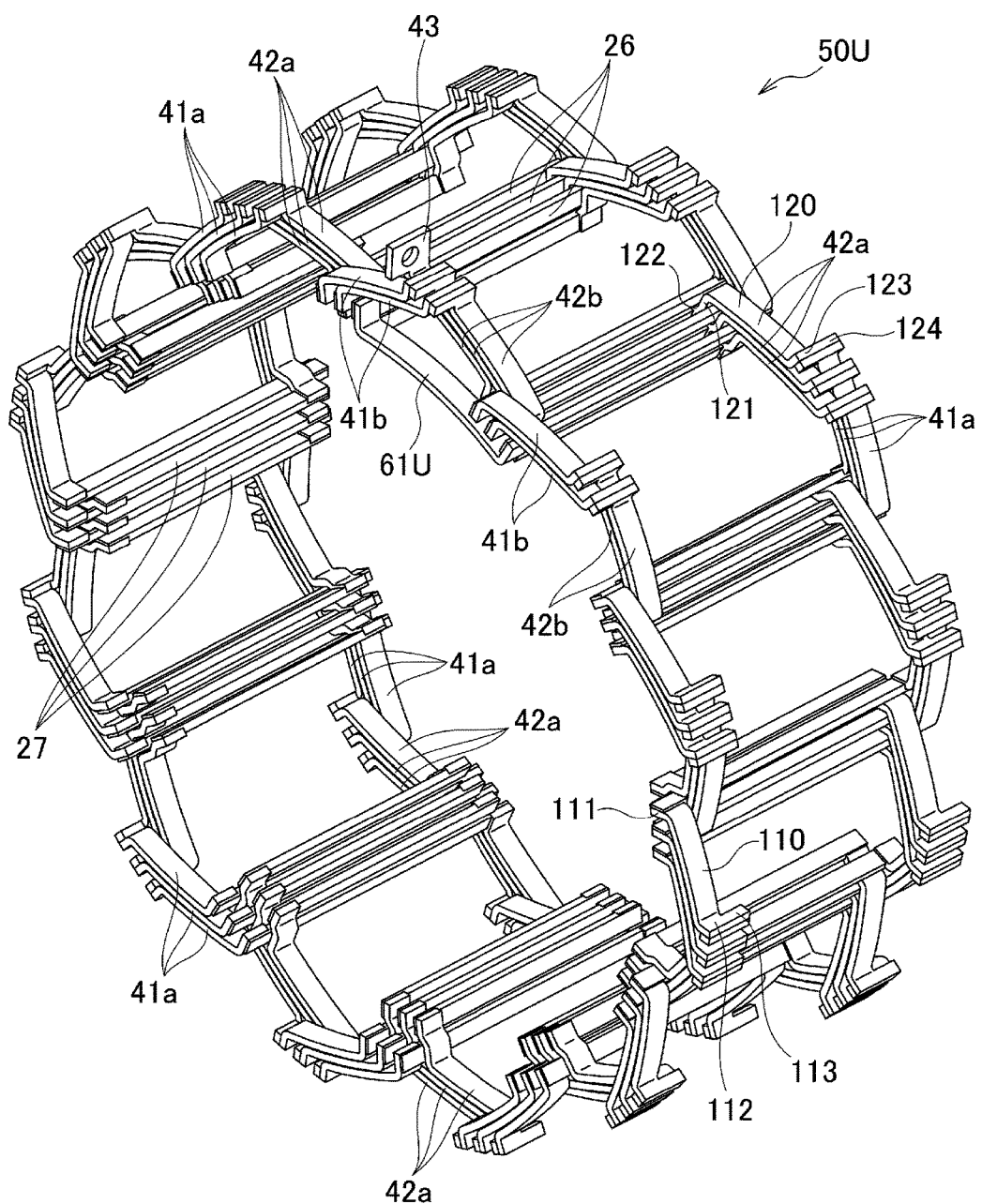
FIG. 10 is a perspective view of a coil of one phase that is taken out of the coils of plurality of phases shown in FIG. 8.

Consequently, for example, as shown in FIG. 10, in relation to the radially outer slot coil 26 and the radially inner slot coil 27 which are disposed in the same slot 23, the outer connection coil 41 that is connected at one end (a near end in the figure) of the radially outer slot coil 26 extends radially outwards and clockwise to be connected to the inner connection coil 42 of the same phase, while the outer connection coil 41 that is connected at the other end (a far end in the figure) of the radially outer slot coil 26 extends radially outwards and counterclockwise to be connected to the inner connection coil 42 of the same phase. In addition, the inner connection coil 42 that is connected at one end (a near end in the figure) of the radially inner slot coil 27 extends radially outwards and counterclockwise to be connected to the outer connection coil 41 of the same phase, while the inner connection coil 42 that is connected to the other end (a far end in the figure) of the radially inner slot coil 27 extends radially outwards and clockwise to be connected to the outer connection coil 41 of the same phase.

Figure 8:
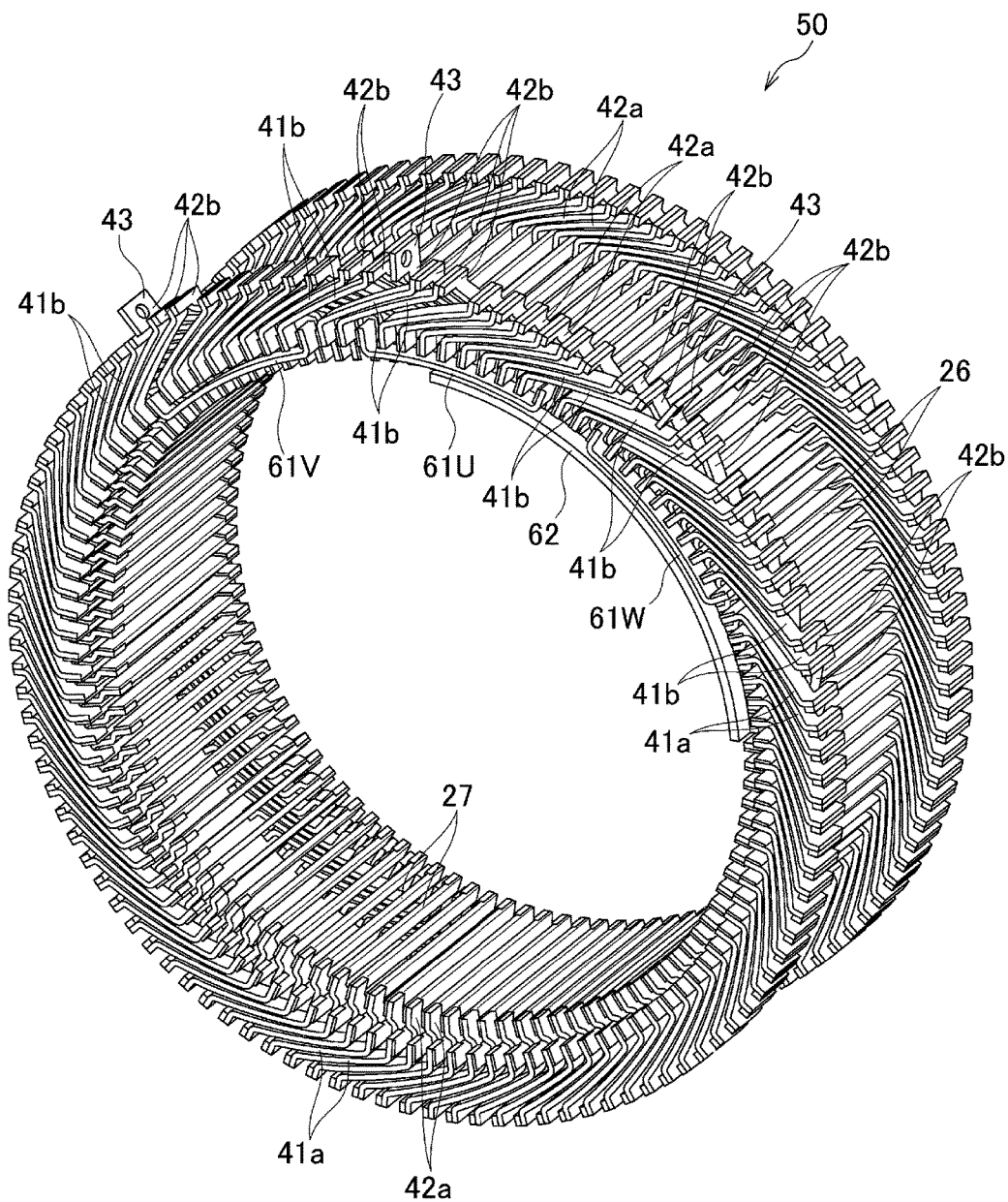
FIG. 8 is a perspective view of coils of different phases.
Figure 9:
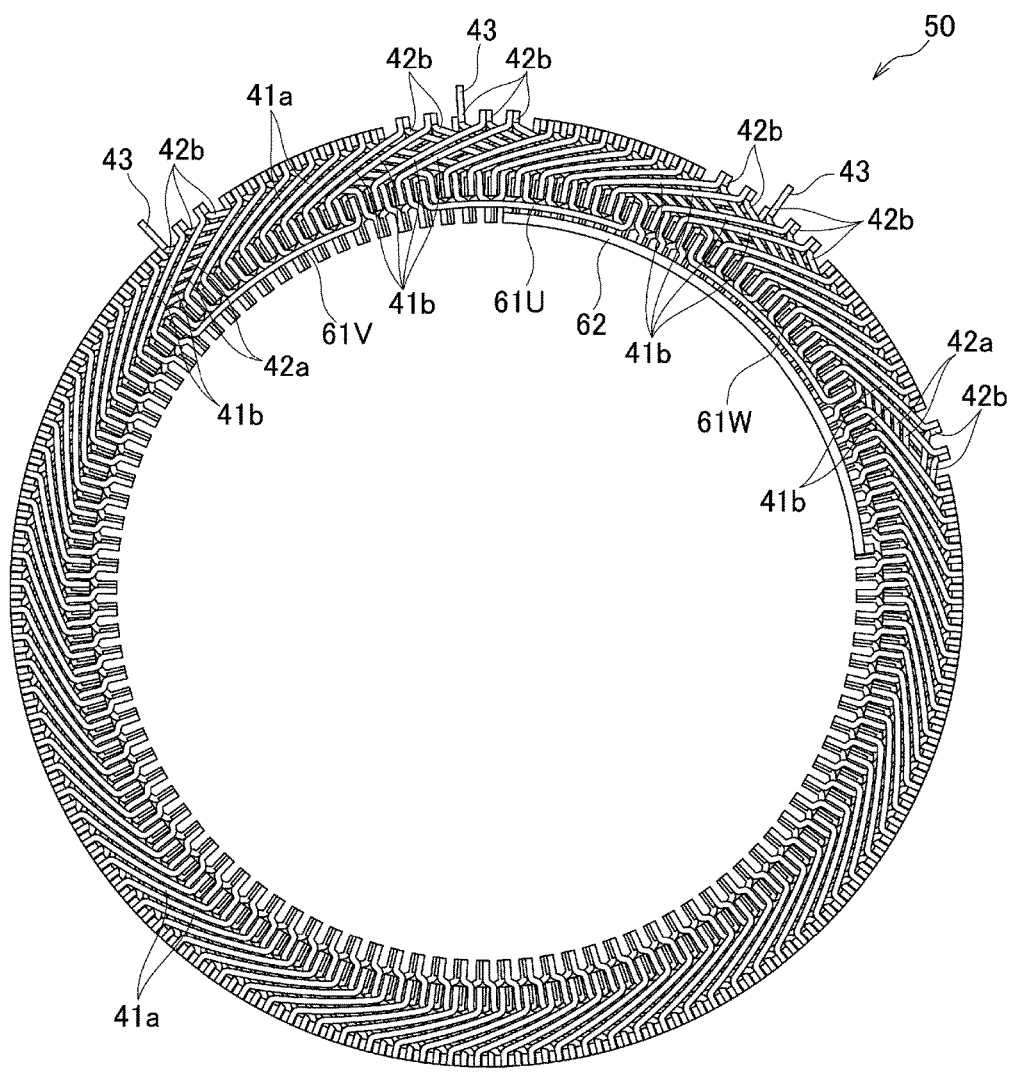
FIG. 9 is a front view of FIG. 8.

In this way, the stator 10 is made up by assembling the pair of base plate assemblies 30L, 30R to both the ends of the stator core assembly 20, whereby the segmented coil 50 forms six coil loops (U-phase coil 50U, V-phase coil 50V, W-phase coil 50W) having the same construction for each phase. In the six coil loops (U-phase coil 50U, V-phase coil 50V, W-phase coil 50W) for each phase, three sets of U-phase coils 50U, three sets of V-phase coils 50V, and three sets of W-phase coils 50W, each set being made up of two coil loops, are wound counterclockwise in this order through wave winding (refer to FIG. 11). FIG. 8 is a perspective view of the coils of the different phases showing the segmented coils of the plurality of phases (U, V, W phases) which are taken out of the stator 10 for the purpose of easy understanding, FIG. 9 is a front view of the FIG. 8, FIG. 10 is a perspective view of the coils of one phase (for example, U phase) which are further taken out of the coils of the plurality of phases, FIG. 11 is a development view showing a mode of connecting the U-phase coils, and FIG. 12 is a schematic diagram showing a mode of connecting the U-phase, V-phase and W-phase coils together.

A mode of connecting the coils of each phase or U phase, for example, will be described in greater detail by reference to FIG. 11. In the six coil loops that make up the U-phase coil, three coil loops (U loops) are continuously wound clockwise through wave winding, while three coil loops (U loops) are continuously wound counterclockwise through wave winding, and the U loops and the U loops are connected in series by the busbar 61U. The radially outer slot coil 26 and the radially inner slot coil 27 that are covered with the insulation material 28 and which are disposed in one slot 23 are made up of the coil that make up the U loop and the coil that make up the U loop, and an electric current flows in the same direction.

Figure 11:
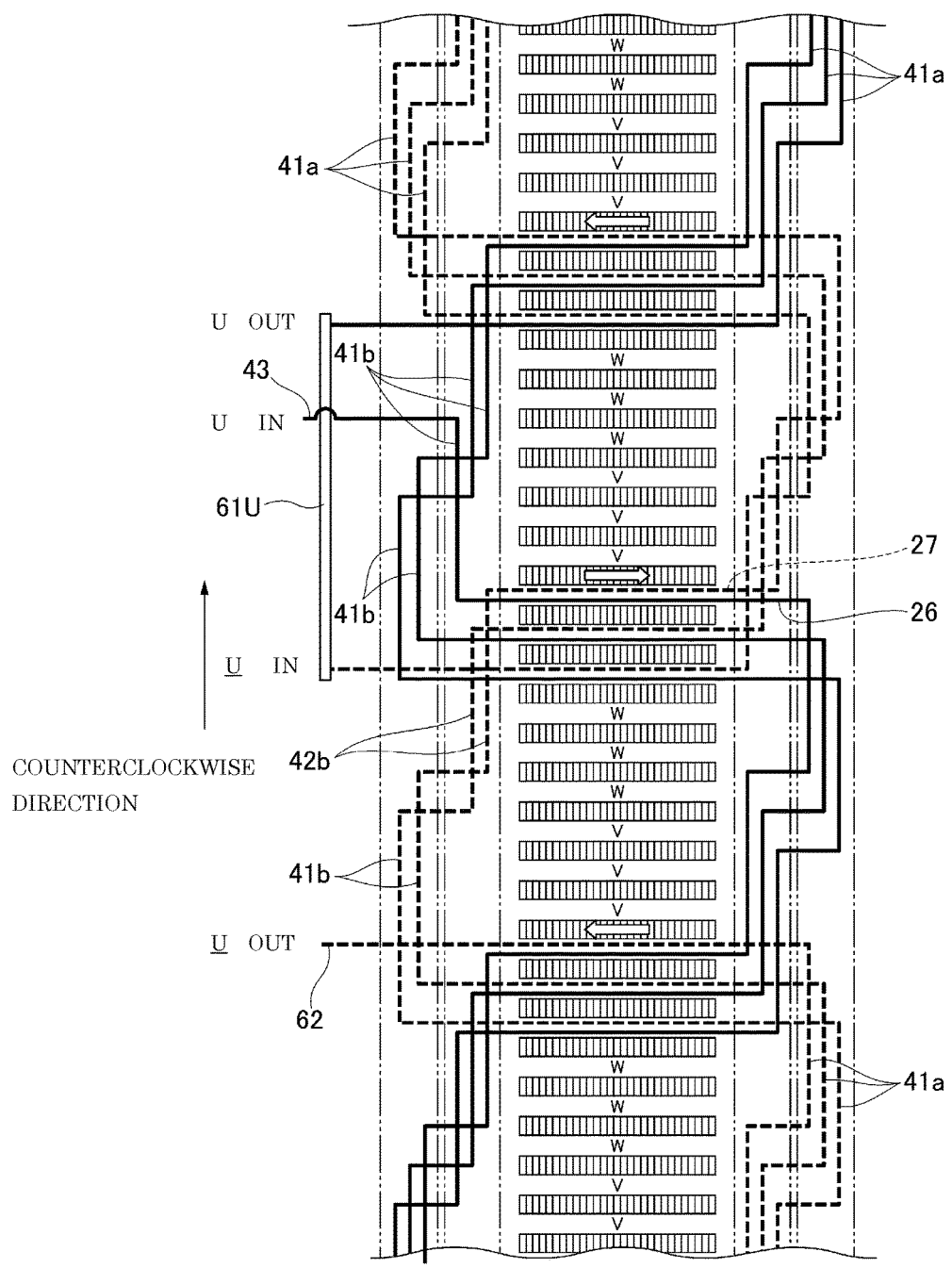
FIG. 11 is a development view showing a mode of connecting a U-phase coils.
Figure 12:
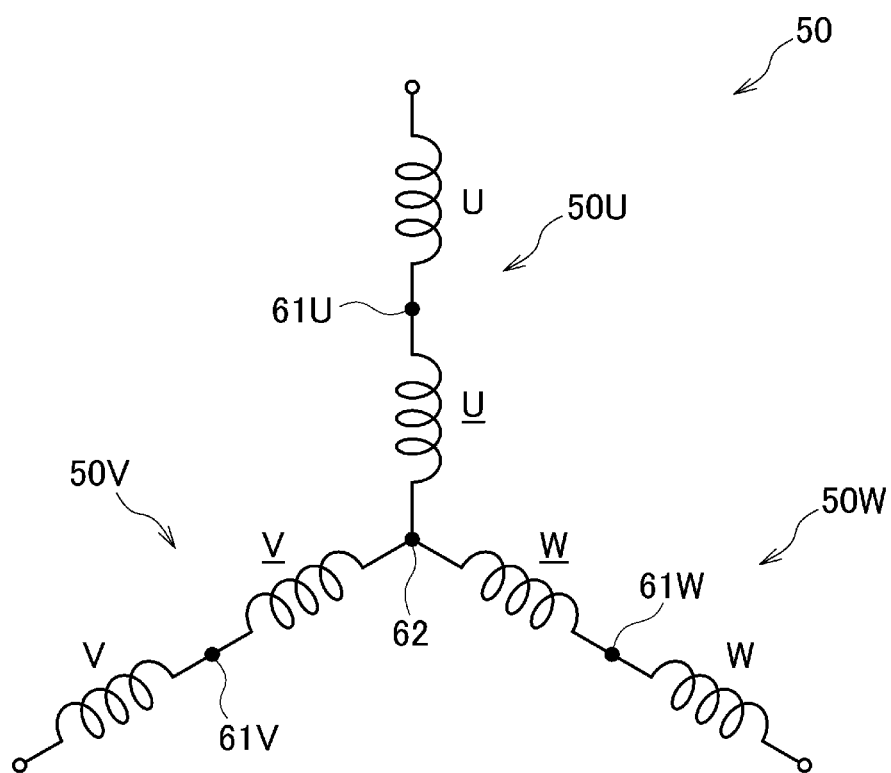
FIG. 12 is a schematic view showing a mode of connecting U-phase, V-phase and W-phase coils.

For example, when paying attention to one of the U loops, as shown in FIG. 11, the coil is connected from an axial end (a right-hand side in the figure) of the radially outer slot coil 26 that is disposed in the U-phase slot 23, and then connected through the outer connection coil 41 and the inner connection coil 42 in this order to the radially inner slot coil 27 in the next U-phase slot 23. Thereafter, the coil is connected from the other axial end (a left-hand side in the figure) of the radially inner slot coil 27, and then connected through the inner connection coil 42 and the outer connection coil 41 in this order to the radially outer slot coil 26 in the following U-phase slot 23. From this on, this connecting configuration is repeated to form the U loop.

Similarly, in six loops that make up one of the coils of the remaining another two phases, that is, the V-phase coil (the W-phase coil), too, three V loops (W loops) and three V loops (W loops) that are wound through wave winding in opposite directions are connected in series by the busbar 61V (the busbar 61W), and the radially outer slot coil 26 and the radially inner slot coil 27 that are disposed in one slot 23 are made up of the coil that make up the V loop (W loop) and the coil that make up the V loop (W loop), and an electric current flows in the same direction. The U-phase coil 50U, the V-phase coil 50V and the W-phase coil 50W are star connected at the middle point busbar 62 as shown in FIG. 12.

In the stator 10, the outer connection coil 41 and the inner connection coil 42 are disposed within an area produced by projecting the stator core 21 in the axial direction and are disposed in different positions in relation to the axial direction. In addition, outer surfaces of the plurality of outer connection coils 41a, 41b that are disposed axially outwards of the stator 10 flush with the end faces of the base plates 31L, 31R.

In addition, the stator 10, since the coil 50 is formed as a result of the slot coils 25 being joined to the connection coils 40, the electric conductivities of both the coils 25, 40 can be made to differ from each other. In the slot coil 25 disposed in the slot 23, the sectional area of the conductor tends to be limited by the limitation on the dimensions of the slot 23. However, the connection coil 40 that is situated axially outwards of the axial end face of the stator core 21 is free from the limitation described above, and therefore, the sectional area of the conductor of the connection coil 40 that intersects the electric current direction at right angles is made greater than the sectional area of the conductor of the slot coil 25 that intersects the electric current direction at right angles as much as possible to such an extent that an axial installation space of the stator permits, whereby the increase in electric resistance of the whole of the coil can be suppressed, thereby making it possible to suppress the copper loss. In addition to this, the connection coil 40 may be made of a material whose electric conductivity is smaller than the electric conductivity of the material that makes up the slot coil 25. For example, the slot coil 25 is made of copper, while the connection coil 40 is made of aluminum that is less expensive than copper, whereby the increase in production costs can be suppressed while suppressing the increase in electric resistance of the whole of the coil.

Thus, as has been described heretofore, according to the stator for the electric rotary machine 10 of this embodiment, since the slot coil 25 and the connection coil 40 are formed of the plate conductors, a projecting portion and a hole portion do not have to be formed with such a high accuracy as required for the conventional crimping portions. In addition, since the clot coils 25 and the connection coils 40 can be easily produced using the conductive material by the pressing and punching method or the like, the increase in production costs can be suppressed. In particular, since the slot coils 25 and the connection coils 40 can be formed of the common sheet material by making the thickness of the slot coils 25 equal to the thickness of the connection coils 40, the yield of the material can be improved, thereby making it possible to suppress the increase in production costs. As described above, by changing the thickness of the connection coils 40, the sectional area of the conductors of the connection coils 40 can be changed to differ from that of the slot coils 25, and further the connection coils 40 can be formed of a different material.

Since the slot coils 25 and the connection coils 40 are joined together on the abutment surfaces P2, P3 in such a state that the plate surfaces of the plate conductors thereof are caused to face each other for surface contact, it becomes easy to ensure the joining area, whereby not only can the joining strength be ensured but also the increase in contact resistance can be suppressed.

In addition, since the step portions 26a, 27a are formed on the abutment portions of the slot coils 25 and the connection coils 40, the slot coils 25 and the connection coils 40 can easily be positioned at the step portions 26a, 27a, whereby the space where to dispose any fastening jig on the periphery can be omitted. In the embodiment, while the step portions 26a, 27a are formed on the radially outer slot coil 26 and the radially inner slot coil 27, the invention is not limited thereto. Thus, step portions may be formed on the radially inner end portion 111 of the outer connection coil 41 and the radially inner end portion 122 of the inner connection coil 42.

Additionally, since the thickness (t1) of the connection coil 40 that is arranged so that the plate surfaces to be joined follow an axial direction is smaller than the axial width (L2) thereof, the connection coils 40 of the different phases that are arranged in the same axial position can be disposed closely in the circumferential direction. By adopting this configuration, the increase in axial width (the increase in the number of stages) can be suppressed which would otherwise be caused by stacking up the connection coils 40 of the different phases in the axial direction, whereby the stator 10 can be made smaller in size as a whole.

In the radially inner connection coil 42 and the radially outer connection coil 41 that make up the connection coil 40 that are disposed in the different axial positions, since the outer connection coil extending portion 113 and the inner connection coil extending portion 124 are joined to each other, the necessity of preparing a connection member like a pin to connect the inner connection coil 42 and the outer connection coil 41 together is obviated, whereby the increase in the number of constituent parts that make up the connection coil 40 can be suppressed. It should be noted that an axial extending portion may be formed only on either of the inner connection coil 42 and the outer connection coil 41.

It is preferable that the surfaces of the slot coil 25 and the connection coil 40 have no insulation coatings. Since the insulation between the adjacent slot coils 25 or the adjacent connection coils 40 can be ensured by the base plates 31L, 31R and the insulation material 28 without coating the surfaces of the slot coils 25 and the connection coils 40 with the insulation coatings, the increase in production costs can be suppressed, compared with a case where a conductor is used on which an insulating coating is formed in advance.

The invention is not limited to the embodiment which has been described heretofore and hence can be modified or improved as required.

For example, in the embodiment, while the stator of triple slot type is illustrated in which the coils of the same phase are disposed in every three slots that lie adjacent to one another in the circumferential direction, the invention is not limited to this configuration. Thus, a stator of single slot type in which coils of different phases are disposed individually and sequentially in slots that are arranged in the circumferential direction or a stator of double slot type in which coils of the same phase are disposed in every two slots that lie adjacent to each other in the circumferential direction may be used.

The form of connecting the coils is not limited to the one described in the embodiment. Thus, arbitrary specifications can be selected, and a direct connection and a parallel connection can also be selected as required.

Figure 17:
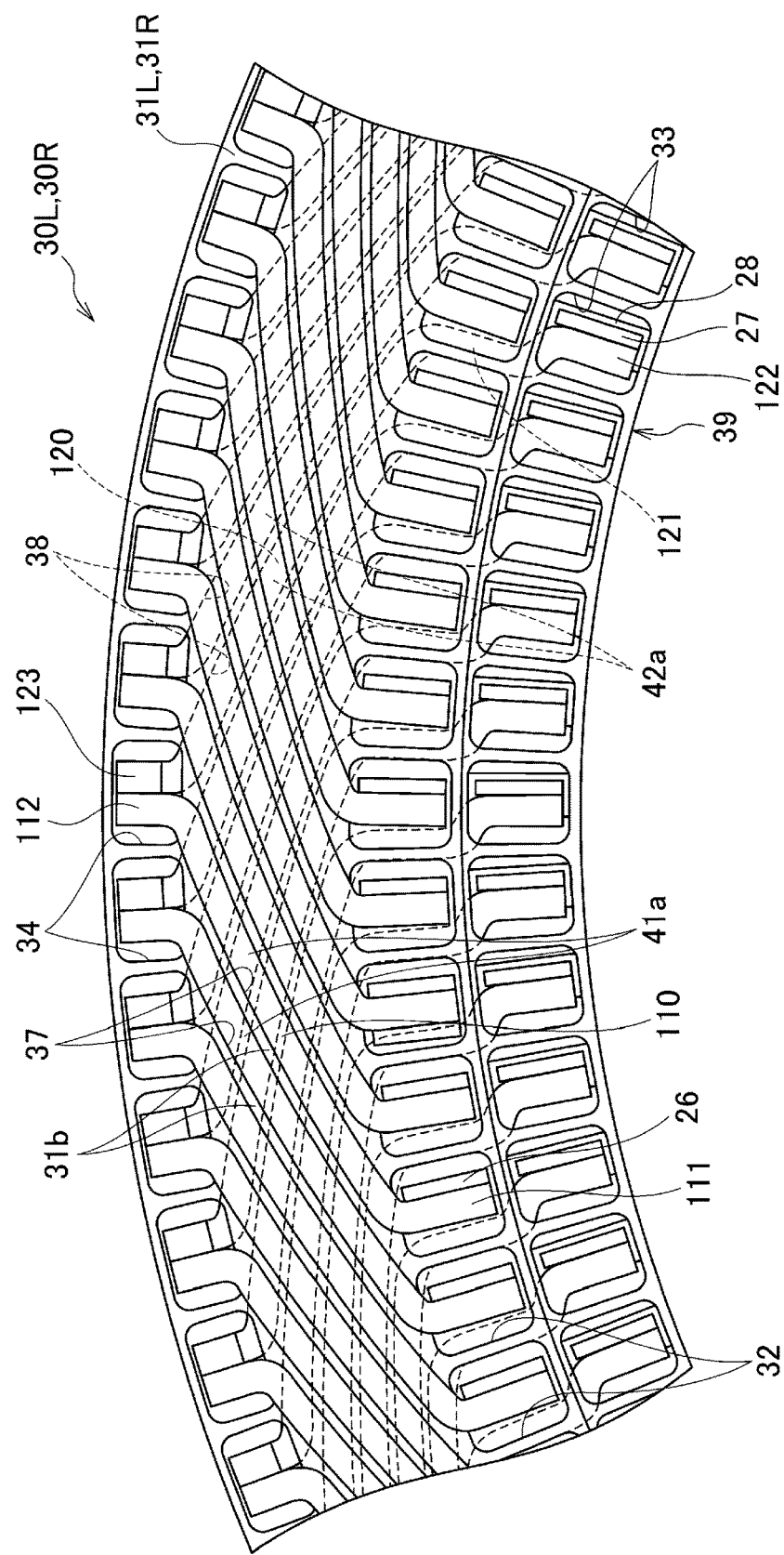
FIG. 17 is a front view showing part of a base plate assembly of a modified example.

In the embodiment, the step portions 26a, 27a are formed at the distal end portions of the radially outer slot coil 26 and the radially inner slot coil 27 so as to be oriented in opposite circumferential directions. However, as shown in FIG. 17, a configuration may be adopted in which the step portions 26a, 27a are formed at the distal end portions of the radially outer slot coil 26 and the radially inner slot coil 27 so as to be oriented in the same circumferential direction so that the radially inner end portion 111 of the outer connection coil 41 and the radially inner end portion 122 of the inner connection coil 42 are brought into abutment with each other from the same direction.

In addition, an insulating cover may be disposed axially outwards of the pair of base plate assemblies 30L, 30R, and they may be covered with a resin or the like.

DESCRIPTION OF REFERENCE NUMERALS AND CHARACTERS 10 stator for electric rotary machine
20 stator core assembly
21 stator core
21a, 21b axial end face of stator core
23 slot
25 slot coil (coil)
26 radially outer slot coil
26a step portion
26b side surface
27 radially inner slot coil
27a step portion
27b side surface
28 insulation material
30L, 30R base plate assembly
31L, 31R base plate
40 connection coil (coil)
41, 41a, 41b outer connection coil
42, 42a, 42b inner connection coil
50 coil
111a side surface
113 outer connection coil extending portion
122a side surface
124 inner connection coil extending portion
P2, P3 abutment surface (abutment portion)

The invention claimed is:

1. A stator for an electric rotary machine comprising:
a stator core, which has plural slots; and
a coil, which is attached to the stator core, wherein:
the coil has plural slot coils, each slot coil being inserted into the slot, and plural connection coils, each connection coil connecting the slot coils in a position lying further axially outwards than an axial end face of the stator core, and is constituted in such a way that the slot coil and the connection coil are joined at an abutment portion;
the slot coil and the connection coil are formed by plate conductors, the plate conductor having a plate surface that is planar and that intersects a thickness direction thereof;
the plate surface of the slot coil is brought into surface contact with the plate surface of the connection coil in the abutment portion;
the slot coil includes a radially inner slot coil, and a radially outer slot coil which is longer than the radially inner slot coil; and
a middle point connecting coil that connects coils of U phase, V phase, and W phase together is connected to the radially inner slot coils.

2. The stator for an electric rotary machine according to claim 1, wherein:
a step portion is formed on at least one of the slot coil and the connection coil in such a way that a thickness thereof is reduced partially; and
an other of the slot coil and the connection coil is brought into abutment with the step portion formed on the at least one of the slot coil and the connection coil.

3. The stator for an electric rotary machine according to claim 1, wherein:
the connection coils are aligned so that the plate surfaces thereof follow an axial direction; and
a thickness of the connection coil is smaller than an axial width thereof.

4. The stator for an electric rotary machine according to claim 1, wherein:
the connection coil comprises an inner connection coil and an outer connection coil that are disposed in different axial positions;
at least one of the inner connection coil and the outer connection coil comprises an axial extending portion that extends in the axial direction; and
the inner connection coil and the outer connection coil are joined together via the axial extending portion.

5. The stator for an electric rotary machine according to claim 1, wherein
 a thickness of the slot coil and a thickness of the connection coil are equal to each other.

6. The stator for an electric rotary machine according to claim 1, wherein
 a sectional area of the connection coil that intersects an electric current direction at a right angle is greater than a sectional area of the slot coil that intersects the electric current direction at a right angle.

7. The stator for an electric rotary machine according to claim 6, wherein
 an electric conductivity of a material that makes up the connection coil is smaller than an electric conductivity of a material that makes up the slot coil.

8. The stator for an electric rotary machine according to claim 1, wherein:
 the slot coils are covered with an insulation material; and
 the connection coils are accommodated in an insulation plate.

9. The stator for an electric rotary machine according to claim 8, wherein
 surfaces of the slot coil and the connection coil have no insulation coatings.

10. A stator for an electric rotary machine comprising:
 a stator core, which has plural slots; and
 a coil, which is attached to the stator core, wherein:
 the coil has plural slot coils, each slot coil being inserted into the slot, and plural connection coils, each connection coil connecting the slot coils in a position lying further axially outwards than an axial end face of the stator core, and is constituted in such a way that the slot coil and the connection coil are joined at an abutment portion; and
 a sectional area of the connection coil that intersects an electric current direction at a right angle is greater than a sectional area of the slot coil that intersects the electric current direction at a right angle.

* * * * *